(12) United States Patent
Srinivasan et al.

(10) Patent No.: US 11,763,157 B2
(45) Date of Patent: Sep. 19, 2023

(54) PROTECTING DEEP LEARNED MODELS

(71) Applicant: Microsoft Technology Licensing, LLC, Redmond, WA (US)

(72) Inventors: Sriram Srinivasan, Sammamish, WA (US); David Yuheng Zhao, Redmond, WA (US); Ming-Chieh Lee, Bellevue, WA (US); Mu Han, Clyde Hill, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 465 days.

(21) Appl. No.: 16/828,889

(22) Filed: Mar. 24, 2020

(65) Prior Publication Data
US 2021/0133577 A1 May 6, 2021

Related U.S. Application Data

(60) Provisional application No. 62/929,911, filed on Nov. 3, 2019.

(51) Int. Cl.
*G06F 7/00* (2006.01)
*G06N 3/082* (2023.01)
(Continued)

(52) U.S. Cl.
CPC ............. *G06N 3/082* (2013.01); *G06F 17/16* (2013.01); *G06N 5/04* (2013.01); *G06N 20/00* (2019.01)

(58) Field of Classification Search
CPC ........... G06F 17/16; G06N 20/00; G06N 5/04
(Continued)

(56) References Cited

U.S. PATENT DOCUMENTS 4,177,476 A   12/1979  Kroger et al.
4,242,534 A   12/1980  Marsing
(Continued)

FOREIGN PATENT DOCUMENTS

CN      108804931 A      11/2018

OTHER PUBLICATIONS

Zhoneshu Gu et al., "Securing Input Data of Deep Learning Inference Systems via Partitioned Enclave Execution," (Year: 2018).*
(Continued)

*Primary Examiner* — Alexandria Y Bromell
(74) *Attorney, Agent, or Firm* — Klarquist Sparkman, LLP

(57) ABSTRACT

Apparatus and methods are disclosed for using machine learning models with private and public domains. Operations can be applied to transform input to a machine learning model in a private domain that is kept secret or otherwise made unavailable to third parties. In one example of the disclosed technology, a method includes applying a private transform to produce transformed input, providing the transformed input to a machine learning model that was trained using a training set modified by the private transform, and generating inferences with the machine learning model using the transformed input. Examples of suitable transforms that can be employed include matrix multiplication, time or spatial domain to frequency domains, and partitioning a neural network model such that an input and at least one hidden layer form part of the private domain, while the remaining layers form part of the public domain.

20 Claims, 12 Drawing Sheets

(51) Int. Cl.
    *G06F 17/16* (2006.01)
    *G06N 5/04* (2023.01)
    *G06N 20/00* (2019.01)
(58) Field of Classification Search
    USPC .......................................................... 706/15
    See application file for complete search history.

(56) References Cited

U.S. PATENT DOCUMENTS

| | | |
|---|---|---|
| 4,366,494 A | 12/1982 | Ohta |
| 4,660,061 A | 4/1987 | Sweeny et al. |
| 5,110,034 A | 5/1992 | Simmonds |
| 5,326,988 A | 7/1994 | Ishida |
| 5,386,870 A | 2/1995 | Nieman et al. |
| 5,571,602 A | 11/1996 | Eckels et al. |
| 5,773,875 A | 6/1998 | Chan |
| 5,793,056 A | 8/1998 | Forrester et al. |
| 5,821,556 A | 10/1998 | Chew et al. |
| 6,051,846 A | 4/2000 | Burns et al. |
| 6,088,604 A | 7/2000 | Williams et al. |
| 6,304,538 B1 | 10/2001 | Hayashi |
| 6,352,741 B1 | 3/2002 | Chan et al. |
| 6,353,234 B1 | 3/2002 | Faley et al. |
| 6,438,967 B1 | 8/2002 | Sarwinski et al. |
| 6,642,608 B1 | 11/2003 | Hu |
| 9,880,365 B2 | 1/2018 | Goutzoulis et al. |
| 10,445,641 B2 * | 10/2019 | Srinivasan .............. G06N 3/047 707/707 |
| 10,795,984 B1 * | 10/2020 | Rafferty .................. G06F 21/40 707/707 |
| 11,386,295 B2 * | 7/2022 | Silberman ........... G06F 21/6218 707/707 |
| 2005/0062131 A1 | 3/2005 | Murduck et al. |
| 2005/0092981 A1 | 5/2005 | Hung |
| 2006/0072254 A1 | 4/2006 | Sargent et al. |
| 2006/0240991 A1 | 10/2006 | Takahashi |
| 2007/0185706 A1 | 8/2007 | Chen et al. |
| 2008/0015850 A1 | 1/2008 | Chen et al. |
| 2008/0278166 A1 | 11/2008 | Wosik et al. |
| 2010/0087322 A1 | 4/2010 | Yuan et al. |
| 2010/0184604 A1 | 7/2010 | Roden et al. |
| 2010/0210468 A1 | 8/2010 | Lee et al. |
| 2013/0082804 A1 | 4/2013 | Kawaguchi |
| 2013/0258595 A1 | 10/2013 | Tuckerman |
| 2014/0100119 A1 | 4/2014 | Schlenga et al. |
| 2014/0110848 A1 | 4/2014 | Taylor et al. |
| 2016/0125311 A1 | 5/2016 | Fuechsle et al. |
| 2017/0084280 A1 | 3/2017 | Srinivasan et al. |
| 2017/0123171 A1 | 5/2017 | Goutzoulis et al. |
| 2018/0089574 A1 * | 3/2018 | Goto ....................... G06N 5/04 707/707 |
| 2018/0129900 A1 | 5/2018 | Kiraly et al. |
| 2018/0150488 A1 * | 5/2018 | Runchey .................... G06F 8/31 707/707 |
| 2018/0268296 A1 * | 9/2018 | Zheng ................. G06F 18/2414 707/707 |
| 2019/0051286 A1 | 2/2019 | Sorensen et al. |
| 2019/0073993 A1 | 3/2019 | Cutler et al. |
| 2019/0130272 A1 * | 5/2019 | Yosinski ................ G06N 3/082 707/707 |
| 2019/0259404 A1 | 8/2019 | Srinivasan et al. |
| 2020/0019842 A1 * | 1/2020 | Kim ......................... G06N 3/08 707/707 |
| 2020/0194017 A1 | 6/2020 | Jensen et al. |
| 2020/0194029 A1 | 6/2020 | Jensen et al. |
| 2020/0401866 A9 * | 12/2020 | Atkinson ........... G06K 19/0702 707/707 |
| 2021/0097427 A1 * | 4/2021 | Clark ..................... G06N 20/00 707/707 |
| 2022/0044120 A1 * | 2/2022 | Pham ..................... G06N 3/042 707/707 |

OTHER PUBLICATIONS

"International Search Report and Written Opinion Issued in PCT Application No. PCT/US20/056734", dated Feb. 10, 2021, 12 Pages.

Gu, et al., "Securing Input Data of Deep Learning Inference Systems via Partitioned Enclave Execution", In arxiv preprint arxiv, Cornell University Library, Jul. 3, 2018, 14 Pages.

Anonymous, Artificial Intelligence Index 2017 Annual Report, Nov. 2017, 101 pages.

Baydin et al., "Automatic Differentiation in Machine Learning: a Survey," Journal of Machine Learning Research 18 (2018), Feb. 5, 2018, 43 pages (also published as arXiv:1502.05767v4 [cs.SC] (Feb. 5, 2018)).

Chen et al., "Compressing Neural Networks with the Hashing Trick," In International Conference on Machine Learning, pp. 2285-2294 (2015) (also cited as arXiv: 1504.04788v1 [cs.LG] Apr. 19, 2015).

Chiu et al., State-of-the-art Speech Recognition with Sequence-to-Sequence Models. CoRR, abs/1712.01769, 2017 (also cited as arXiv:1712.01769v6 [cs.CL] Feb. 23, 2018).

Colah, "Understanding LSTM Networks," posted on Aug. 27, 2015, 13 pages.

CS231n Convolutional Neural Networks for Visual Recognition, downloaded from cs231n.github.io/optimization-2, Dec. 20, 2018, 9 pages.

Denil et al., Predicting Parameters in Deep Learning, In Advances in Neural Information Processing Systems, Dec. 2013, pp. 2148-2156.

Dowlin et al., "CryptoNets: Applying Neural Networks to Encrypted Data with High Throughput and Accuracy," Proceedings of the 33$^{rd}$ International Conference on Machine Learning, Jun. 2016, 10 pages.

"FFT/IFFT Block Floating Point Scaling," Altera Corporation Application Note 404, Oct. 2005, ver. 1.0, 7 pages.

Goodfellow et al., "Deep Learning," downloaded from http://www.deeplearningbook.org/ on May 2, 2018, (document dated 2016), 766 pages.

Gomez, "Backpropogating an LSTM: A Numerical Example," Apr. 18, 2016, downloaded from medium.com/@aidangomez/let-s-do-this-f9b699de31d9, Dec. 20, 2018, 8 pages.

He et al., "Deep Residual Learning for Image Recognition," arXiv preprint arXiv:1512.03385v1 [cs.CV] Dec. 10, 2015.

Ioffe et al., "Batch Normalization: Accelerating Deep Network Training by Reducing Internal Covariate Shift," arXiv:1502.03167v3 [cs.LG], Mar. 2015, 11 pages.

Jain et al., "Gist: Efficient Data Encoding for Deep Neural Network Training," 2018 ACM/IEEE 45th Annual International Symposium on Computer Architecture, Jun. 2018, 14 pages.

Karl N's Blog., "Batch Normalization—What the hey?," Posted on Jun. 7, 2016, downloaded from gab41.lab41.org/batch-normalization-what-the-hey-d480039a9e3b, Jan. 9, 2019, 7 pages.

Kevin's Blog, "Deriving the Gradient for the Backward Pass of Batch Normalization," Posted on Sep. 14, 2016, downloaded from kevinzakka.github.io/2016/09/14/batch_normalization/, Jan. 9, 2019, 7 pages.

Kratzert's Blog, "Understanding the backward pass through Batch Normalization Layer," Posted on Feb. 12, 2016, downloaded from kratzert.github.io/2016/02/12/understanding-the-gradient-flow-through-the-bathch-nor . . . on Jan. 9, 2019, 17 pages.

Langhammer et al., "Floating-Point DSP Block Architecture for FPGAs," Proceedings of the 2015 ACM/SIGDA International Symposium on Field-Programmable Gate Arrays, Feb. 2015, pp. 117-125.

Le et al., "Neural Architecture Search with Reinforcement Learning," PowerPoint presentation, 37 pages.

Le, "A Tutorial on Deep Learning, Part 1: Nonlinear Classifiers and the Backpropagation Algorithm," Dec. 2015, 18 pages.

Le, "A Tutorial on Deep Learning, Part 2: Autoencoders, Convolutional Neural Networks and Recurrent Neural Networks," Oct. 2015, 20 pages.

Li et al., "Stochastic Modified Equations and Adaptive Stochastic Gradient Algorithms," Proceedings of the 34th International Conference on Machine Learning, PMLR 70, 2017, 10 pages.

(56) References Cited

OTHER PUBLICATIONS

Lin et al., "ONNC: A Compilation Framework Connecting ONNX to Proprietary Deep Learning Accelerators," 2019 IEEE International Conference on Artificial Intelligence Circuits and Systems (AICAS), Mar. 2019, pp. 214-218.
Lou et al., "Glyph: Fast and Accurately Training Deep Neural Networks on Encrypted Data," arXiv:1911.07101v2 [cs.LG], 3 0 Jan. 2020, 11 pages.
Mellempudi et al., "Ternary Neural Networks with Fine-Grained Quantization," May 2017, 11 pages.
Nandakumar et al., "Towards Deep Neural Network Training on Encrypted Data," 2019 IEEE/CVF Conference on Computer Vision and Pattern Recognition Workshops (CVPRW), Jun. 2019, 9 pages.
Nielsen, "Neural Networks and Deep Learning," downloaded from http://neuralnetworksanddeeplearning.com/index.html on May 2, 2018, document dated Dec. 2017, 314 pages.
Page, "Neural Networks and Deep Learning," http://www.cs.wise.edu/~dpage/cs760/, 73 pp.
Russinovich, "Inside the Microsoft FPGA-based Configurable Cloud," Microsoft Corporation, Powerpoint Presentation; 41 pp. (May 8, 2017).
Smith et al., "A Bayesian Perspective on Generalization and Stochastic Gradient Descent," 6th International Conference on Learning Representations, Apr.-May 2018, 13 pages.
Szegedy et al., "Inception-v4, Inception-ResNet and the Impact of Residual Connections on Learning," arXiv:1602.07261v2, Aug. 23, 2016, 12 pages.
Szegedy et al., "Rethinking the Inception Architecture for Computer Vision," arXiv:1512.00567v3 [cs.CV] Dec. 11, 2015, 10 pages.
TITU1994 Blog, "Neural Architecture Search with Controller RNN," downloaded from github.com/titu1994/neural-architecture-search on Jan. 9, 2019, 3 pages.
Vucha et al., "Design and FPGA Implementation of Systolic Array Architecture for Matrix Multiplication," International Journal of Computer Applications, vol. 26, No. 3, Jul. 2011, 5 pages.
Weinberger et al., "Feature Hashing for Large Scale Multitask Learning," In Proceedings of the 26th Annual International Conference on Machine Learning, Jun. 2009, 8 pages.
Wen et al., "Learning Structured Sparsity in Deep Neural Networks," In Advances in Neural Information Processing Systems, Dec. 2016, pp. 2074-2082 (also published as arXiv:1608.036654v4 [cs.NE] Oct. 18, 2016).
Xiong et al., "Achieving Human Parity in Conversational Speech Recognition," arXiv:1610.05256v2 [cs:CL] Feb. 17, 2017, 13 pages.
Yeh, "Deriving Batch-Norm Backprop Equations," downloaded from chrisyeh96.github.io/2017/08/28/deriving-batchnorm-backprop on Dec. 20, 2018, 5 pages.
Zhang et al., "GELU-Net: A Globally Encrypted, Locally Unencrypted Deep Neural Network for Privacy-Preserved Learning," Proceedings of the 27$^{th}$ International Joint Conference on Artificial Intelligence, Jul. 2018, pp. 3933-3939.
Zoph et al., "Learning Transferable Architectures for Scalable Image Recognition," arXiv.1707.07012v1, Jul. 2017, 14 pages.
Zoph et al., "Neural Architecture Search with Reinforcement Learning," 5th International Conference on Learning Representations, Apr. 2017, 16 pages.

* cited by examiner

PROTECTING DEEP LEARNED MODELS

CROSS-REFERENCE TO RELATED APPLICATIONS

This application claims the benefit of U.S. Provisional Application No. 62/929,911, entitled "PROTECTING DEEP LEARNED MODELS," filed Nov. 3, 2019, which application is incorporated herein by reference in its entirety.

BACKGROUND

Data science is increasingly being applied to a wide variety of applications. Machine learning models are consuming larger amounts of memory, storage, and processing resources as these models are deployed to new areas. In particular, obtaining well-trained machine learning models can take substantial time, effort, and skill to develop models that are well-behaved across a wide variety of input datasets. Data for machine learning models may be encrypted in order to prevent unauthorized access to trained machine learning models. Thus, as the usage and size of machine learning models increases, the memory, storage, and processing resources used to encrypt and decrypt these models increases accordingly. Further, machine learning models may be stored and used in proprietary formats or in open access formats. Accordingly, there is ample opportunity for improvement in technology used to protect machine learning models from unauthorized access.

SUMMARY

Apparatus and methods are disclosed for using machine learning models with computing resources having at least one private access domain and one public access domain. Operations can be applied to transform input to a machine learning model in the private domain that is kept secret or otherwise made unavailable to third parties. The transformed input is then provided to a machine learning model. Because the machine learning model is not usable without transforming the input according to the private domain transformation, the rest of the machine learning model can be made publicly available and distributed.

In some examples of the disclosed technology, a machine learning model can be trained using the private domain transformation, and the public portion provided to third parties. Users of the publicly-provided machine learning model use a processor to transform the user's input and apply the transformed input to the public domain machine learning model. Users that do not have access to the private domain transform will hence generate inaccurate results if untransformed data is applied to the public domain machine learning model. In some examples, the public domain of the machine learning model can be provided without encryption or other measures to block access. Examples of suitable transforms include matrix multiplication by a secret matrix, generating a frequency transform (e.g., using a fast Fourier transform), including optionally rearranging frequency bins, or other suitable transformation. Use of disclosed techniques can allow for use of public machine learning standards, such as Open Neural Network Exchange (ONNX) format or other suitable standards. Computing systems suitable for implementing such machine learning environments include computers having general-purpose processors, neural network accelerators, or reconfigurable logic devices, such as Field Programmable Gate Arrays (FPGA).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures.

DETAILED DESCRIPTION

I. General Considerations

Figure 1:
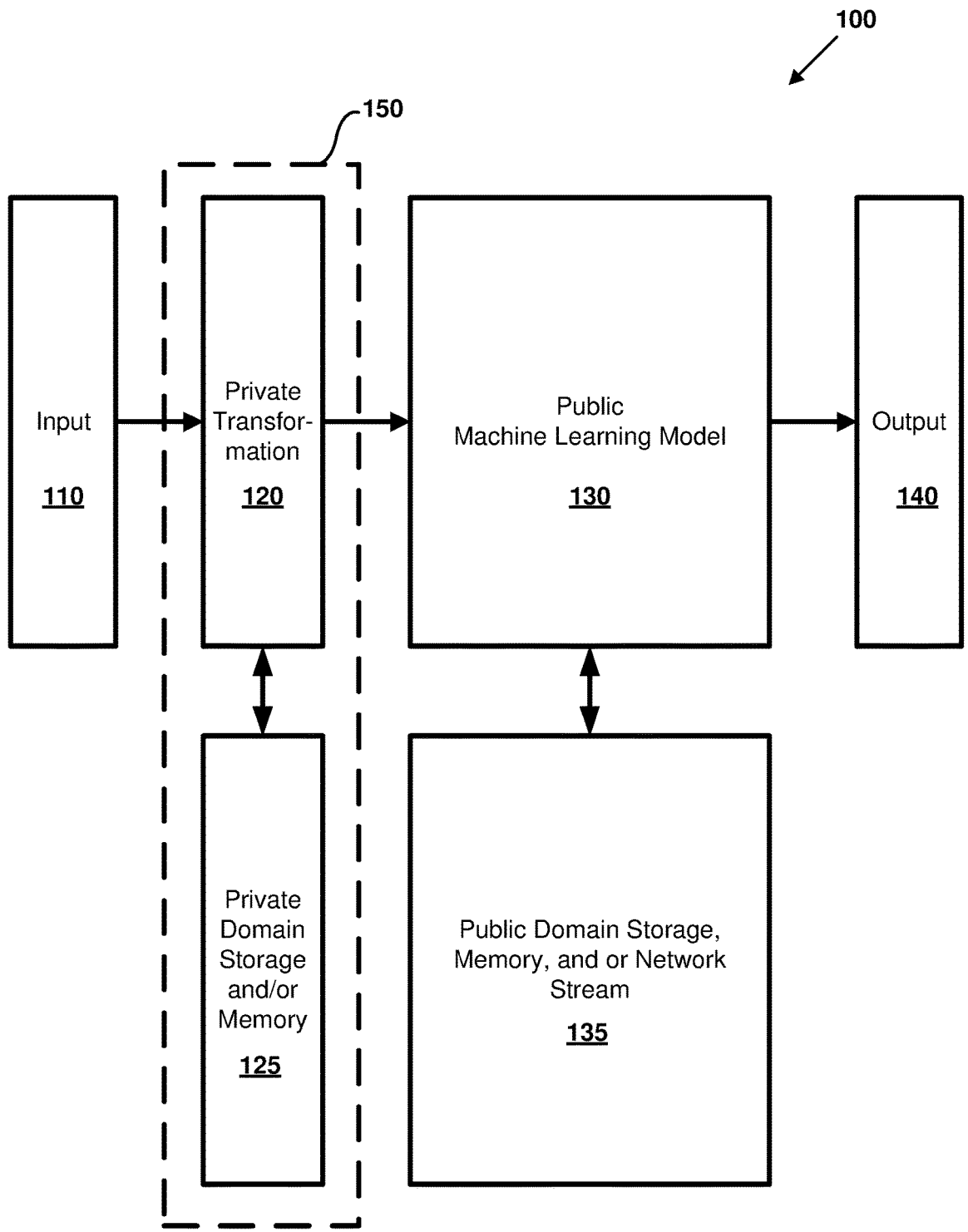
FIG. 1 is a block diagram of a machine learning environment in which disclosed deep learned models can be implemented.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "verify," "execute," "perform," "convert," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it will be readily understood to a person of ordinary skill in the art that the disclosed technology is not limited to any specific computer language or program. For instance, the disclosed technology can be implemented by software written in C, C++, Java, or any other suitable programming language. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Overview of Machine Learning

Machine learning is a field of computer science that uses statistical techniques to give computer systems the ability to extract higher-level features from a set of training data. Specifically, the features can be extracted by training a model such as an artificial neural network (ANN) or a deep neural network (DNN). Artificial Neural Networks (ANNs or as used throughout herein, "NNs") are applied to a number of applications in Artificial Intelligence and Machine Learning including image recognition, speech recognition, search engines, and other suitable applications. The processing for these applications may take place on individual devices such as personal computers or cell phones, but it may also be performed in large datacenters. At the same time, hardware accelerators that can be used with NNs include specialized NN processing units, such as tensor processing units (TPUs) and Field Programmable Gate Arrays (FPGAs) programmed to accelerate neural network processing. Such hardware devices are being deployed in consumer devices as well as in data centers due to their flexible nature and low power consumption per unit computation.

Neural network operations are used in many artificial intelligence operations. Often, the bulk of the processing operations performed in implementing a neural network is in performing Matrix×Matrix or Matrix×Vector multiplications or convolution operations. Such operations are compute- and memory-bandwidth intensive, where the size of a matrix may be, for example, 1000×1000 elements (e.g., 1000×1000 numbers, each including a sign, mantissa, and exponent) or larger and there are many matrices used. As used herein, the use of the term "element" herein refers to a member of such a matrix or vector.

As used herein, the term "tensor" refers to a multi-dimensional array that can be used to represent properties of a NN and includes one-dimensional vectors as well as two-, three-, four-, or larger dimension matrices. As used in this disclosure, tensors do not require any other mathematical properties unless specifically stated.

In one example of the disclosed technology, a neural network accelerator is configured to performing training operations for layers of a neural network, including forward propagation and back propagation.

III. Introduction to the Disclosed Technology

Machine learning models are computer-based models iteratively built using training data that can be used to make predictions for arbitrary input data without explicit human programming. As is known to those of ordinary skill in the relevant art, examples of machine learning models include but are not limited to, supervised discriminative learning models such as artificial neural networks, support vector machines, and conditional random fields and supervised generative machine learning models including Markov random fields and Hidden Markov models. As a high-level example, a computer processor is configured to execute computer-executable instructions to implement these machine learning models by (1) training the model by iteratively applying training input to the model, (2) propagating the training input through the model by performing a number of operations based on model parameters, (3) evaluating error at the output of the model, and (4) adjusting the model parameters to improve the correlation of the machine learning model output values to a set of desired output values. Although explicit human programming is not required to generate a particular machine learning model, useful machine learning models typically use large amounts of data to store their parameters—often on the order of tens of megabytes up to hundreds or thousands of gigabytes or more. Machine learning model providers will often desire to keep their models proprietary or restrict access to their machine learning model in some way. However, processing all of an instance of a machine learning model to restrict access to the model means that large amounts of data are processed to render the data in a format that cannot be accessed by unauthorized or unauthenticated users or compute resources, for example, by encrypting data for the machine learning model instance. Encrypting the data also creates latency and consumes large amounts of processing power to transform the data to a restricted form (e.g., by encrypting the data) and then reverse the transform to the restricted form data (e.g., by decrypting the data) into a usable form prior to further executing the machine learning model. Further, encrypting or otherwise protecting all of the machine learning model data makes open-source and other non-proprietary models cannot be used or are cumbersome to use. Further, machine learning models with restricted access do not provide a way to distribute portions of the model separately. For example, if a machine learning model is encrypted or embedded in an executable file, the entire file must be transmitted in a restricted access channel.

Disclosed methods and apparatus are used to scramble input data used in a machine learning model. The machine learning model is partitioned into two portions implemented in at least two compute resource access domains: a private domain portions and a public domain portion. The private domain portion of the model accepts input data that is transformed into a form suitable for use with the public domain using a scrambler. Access to details of at least a portion and in some cases all of the scrambler are restricted to computing resources configured to access the private domain model. The scrambler produces transformed output that can then be propagated to the public domain portion of the model to perform additional machine learning operations. Access to computing resources configured to access the public domain model can be less strict than for the private domain model. Examples of suitable transformation operations that can be performed by a scrambler include performing matrix operations (for example, multiplying an input vector, matrix, or tensor by a vector, matrix, or tensor that is kept private); transforming audio or image data to frequency domain data, and in some cases scrambling bins of the data in the frequency domain; decrypting the input data using a decryption key or cipher to perform move, transforms, and/or substitution operations on the input data, or implementing some nodes of an artificial neural network in the private domain and the remaining nodes in the public domain.

After training the machine learning model using public and private compute resource domains, the data for the model can be stored or transmitted separately. For example, the private domain data can be stored by storing the scrambled data in a computer-readable storage device or memory. In some examples, the private domain data can be further secured by storing in an encrypted container, embedding within an object code file, storing in a proprietary format, secured using self-modifying code, or using filesystem or database permissions to restrict access to the data. By contrast, the public domain can be store or transmitted in a manner that uses fewer or no access restrictions. For example, the public domain data can be stored in a format that is easily readable to others, in an open source format like ONNX, posted to a public website, or using filesystem or database permissions that are less restrictive than the private domain data.

As will be readily understood to one of ordinary skill in the art having the benefit of the present disclosure, there are a number of practical applications for executing machine learning models according to certain disclosed methods and apparatus. For example, public domain data can be secured, even though it is stored or transmitted in a form having fewer access restrictions than private domain data. Thus, overall load on compute resources is reduced, as only the private domain compute resources use a higher level of resources to secure or scramble input data. Another practical application is securing data for a machine learning model even though the model is stored or transmitted in an openly readable manner. As another practical application, use of the machine learning model is restricted to authorized users, as the input data is not rendered suitable for the public domain portion of the model, and thus the machine leaning model cannot be effectively used, unless the user is provided access to the private domain scrambler. In some examples, another practical application is securing use of the machine learning model without the use of encryption, but by using a scrambler to render the public domain portion of the model unusable unless the input data is transformed by performing transforms.

IV. Example Machine Learning Environment with Deep Learned Models

FIG. 1 is a block diagram 100 of a machine learning environment in which disclosed deep learned models can be implemented. Any appropriately-configured computing system can be used to implement the illustrated machine learning environment.

Machine learning input 110 is provided to a private transformation component 120, for example, a scrambler. The input 110 can be expressed in any suitable format, however, for many implementations, the input 110 is provided as a vector of input values. For example, the input 110 may represent time domain audio signals or two-dimensional images. The private transformation component 120 applies a transformation that is not known to others to the input data. Examples of suitable transformations include but are not limited to: matrix multiplication, frequency domain transformations such as Fourier transformations, discrete Fourier transformations, fast Fourier transformations, or other suitable transformations. The private transformation component 120 stores computer-executable instructions and/or data in a private domain storage and/or memory 125. Any suitable storage device or memory may be used, but access to the private domain storage and/or memory 125 is restricted so that it cannot be inspected by unauthorized users. For example, file access permissions, operating system restrictions, encryption, or other suitable security techniques can be used to restrict unauthorized access to the private domain storage and/or memory 125, thereby preventing others from accessing the information. Together, the private transformation component 120 and the private domain storage and/or memory 125 are an example of a scrambler 150 suitable for implementing disclosed methods of scrambling as described further herein.

In one example of a suitable input transformation, an m×n dimension matrix can be multiplied by an input vector of n×1 dimension, producing an n×1 transformed input vector that is applied to the public machine learning model 130. In examples where a frequency domain transformation is used, frequencies can be assigned to bins according to a set of frequency ranges. Magnitude and/or phase of signal within each of the frequency bins can be averaged. The frequency bins can be rearranged to provide a transformed output. As one example, the frequency bins can be selected according to Bark-scale frequency bands. In some examples, a first number of a plurality of layers of a neural network are used to provide the private transformation, and the remaining layers of the neural network are provided as the public machine learning model 130. The public machine learning model 130 can store data representing its model in the public domain storage, memory, and/or network stream 135. For example, if the public domain storage, memory, and/or network stream 135 includes a network stream, at least a portion of the public machine learning model can be transmitted via a computer network to remote storage (e.g., in a computing cloud or at a remote server0. Such data can be stored in an open source or other publicly accessible formats (e.g., ONNX). The public machine learning model 130 produces a number of outputs 140. For example, in a neural network context, the output is provided as a number of inferences generated using the machine learning model. Public portions of machine learning models can be stored at a number of different places. For example, public models or portions thereof can be stored in storage local to one or more processors at a client or server, at servers accessible to a client via a private or public network, or at an edge server accessible to a client. In some examples at least a portion of the public model is transmitted and/or accessible to a user prior to runtime of an application that uses the public model. For example, the public model portion of a machine learning database can be distributed with code for a software application, stored in a library that is distributed or accessible to a user client employing the model, or distributed via any other suitable method of a priori distribution. In other examples, all or a portion of the public model is provided at runtime. Similarly, the private model can be distributed a priori in a similar fashion as public models. In other examples, the private model is provided or deployed to an application only at runtime. For example, a private model can be deployed or decrypted only after a client user has authenticated with sufficient permissions to access the private model. For example, the private model can be distributed in a dynamically-linked library (DLL) or other object code that is accessed at runtime. In some examples, the private model is encrypted and can be accessed with a key used to decrypt the private model at runtime. For example, a user may be required to authenticate prior to being provided with a key to decrypt the private model. In some examples, access to the private model can be restricted using a license manager that allows access to the private model to be checked out.

Thus, in some examples, the use of private and public models for a machine learning model can allow for only the private model to be distributed with software to a client. Thus, only data for the private model, but not the public model, is distributed in certain example. In such cases, the public portion of the model can be stored, distributed, and or/updated separately or at a later time. As another aspect of the technology, not distributing the public model with an application can help avoid code bloat, as the public model can be updated separately from object and/or source code shipped with an application.

The use of private and public models can have a number of different practical applications. As an example, arbitrary input to a machine learning model can be transformed using private model compute resources that are secured from unauthorized access. The transformation renders the input suitable for use with the public model compute resources, and can be used to train or generate inferences using the public model compute resources. Without the transformation, the public model compute resources cannot generate a usable result, as the public model compute resources depend on having input first transformed into suitable input data by the private model compute resources. Thus, if the private model is not used with the public model, the output of the public model will be unusable because it does not generate reliable predictions.

As another example, an audio processor implemented using machine learning models having private and public domains, as described herein, can first scramble input audio. For example, small time domain windows of the input audio can be transformed to a frequency domain representation comprising a number of frequency bins over the audio signal bandwidth. The frequency bins are scrambled using a scrambler implemented with private domain compute resources. This scrambled, transformed output is sent as input to the public domain portion of the machine learning model, which can use the input to generate inferences or for further training of the machine learning model. However, unless input is transformed using the scrambler, the public domain portion of the machine learning model is not useful, as the input has not first been rendered usable by the private domain portion. Accordingly, unauthorized use of the machine learning model can be prevented by securing the scrambler, without restricting access to the public domain portion of the machine learning model Images can be similarly scrambled to be rendered suitable for a readily accessible public domain machine learning model by transforming the image to the frequency domain (e.g., using a two-dimensional Fourier transform).

As a specific example of a machine learning model, an artificial neural network can be partitioned such one or more layers are implemented using the private domain compute resources and the remaining layers are implemented using the public domain compute resources. For example, the input layer and first hidden layer of an ANN can be provided by the private domain. Training and inference can occur as in other ANNs, but the node weights and/or edge values for the private domain portions have their access restricted. Thus, the bulk of the trained ANN can be distributed in a non-restricted manner, because it relies on input generated by the private domain portion of the neural network. Thus, access to the machine learning model can be prevented by securing the private domain, but not requiring restriction of the public domain model.

As used herein, the term "training" refers to a computer-implemented method of updating a machine learning model using a database of labeled data to determine model weights for a machine learning model selected with respect to one or more criteria. Desirably, the trained model is improved over successive training stages by forward propagating values input to a machine learning model, comparing output of the machine learning model to one or more criteria, and adjusting model weights to improve the correlation of the model to the training input according to the criteria. For example, a machine learning model can be trained by applying a vector of noisy speech to the machine learning model and comparing the output of the model to a number of samples of "clean" speech. The output of the machine learning model can be one or more labels identifying a characteristic of the input, processed audio, image, or video data, or other suitable output. For example, audio input can be generated with a microphone, synthesizer, using audio samples, or combination of the same, including audio pre-processed prior to being provided as input to a machine learning model. Examples of generating image or video sensor data can include using an image sensor capturing light images with a camera and digitizing data from the sensor. In other examples, image or video sensor data can be processed prior to being provided as input to a machine learning model. Physical domain data includes data representing images or audio from capture in a spatial domain (e.g., represented as a raster or vector image) or time domain. Frequency domain samples include samples transformed to a magnitudes and/or phase in a frequency domain for a given audio, image or video signal. Typically, for speech and image processing, the output of the model has the same dimensions as the input data.

As used herein, the term "inference" refers to computer-implemented techniques for using a trained model to process provided input to generate a desired output. For example, inferences can be generated with a machine learning model by accepting noisy speech as input to the model and provide clean speech as the output of the model.

As used herein, the term "adapted to" refers to a structure that is made to, designed to, or configured to the recited use, but not in the broader sense that the recited structure is merely capable of the recited use.

As used herein, "private domain" refers to compute resources in a computing that have access restricted in some manner to particular entities, such as users, groups, processes, or threads. For example, data for transforming input data to transformed data for a machine learning model can be restricted using operating system permissions, file permissions, password protections, two-factor authentication, encryption, steganography, or other suitable techniques. For example, privileged or authenticated users may be able to inspect data and/or executable instructions that non-privileged or non-authenticated users may not. In contrast, "public domain" refers to computing resources that are made available to both restricted and non-restricted entities (of similar type as the previously recited entities: particular entities, such as users, groups, processes, or threads). Thus, only privileged or authenticated users are allowed to access the private domain, and thereby generate transformed data in a usable form for the public machine learning module. However, even though public domain compute resources may have fewer or no access restrictions, machine learning models implemented using the disclosed technologies are not practical to use until input data has been transformed by a scrambler into transformed data suitable for use with the public domain portion of the machine learning model.

As used herein, a "scrambler" refers to hardware and/or software configured to transform input into a form suitable for use with a public domain portion of a machine learning model. Prior to performing this transforming, the input is not suitable for use with the public domain portion. Examples of suitable transformation operations that can be performed by a scrambler include (but are not limited to) performing matrix operations (for example, multiplying an input vector, matrix, or tensor by a vector, matrix, or tensor that is kept private); transforming audio or image data to frequency domain data, and in some cases scrambling bins of the data in the frequency domain; decrypting the input data using a decryption key or cipher to perform move, transforms, and/or substitution operations on the input data, or implementing some nodes of an artificial neural network in the private domain and the remaining nodes in the public domain.

Figure 2:
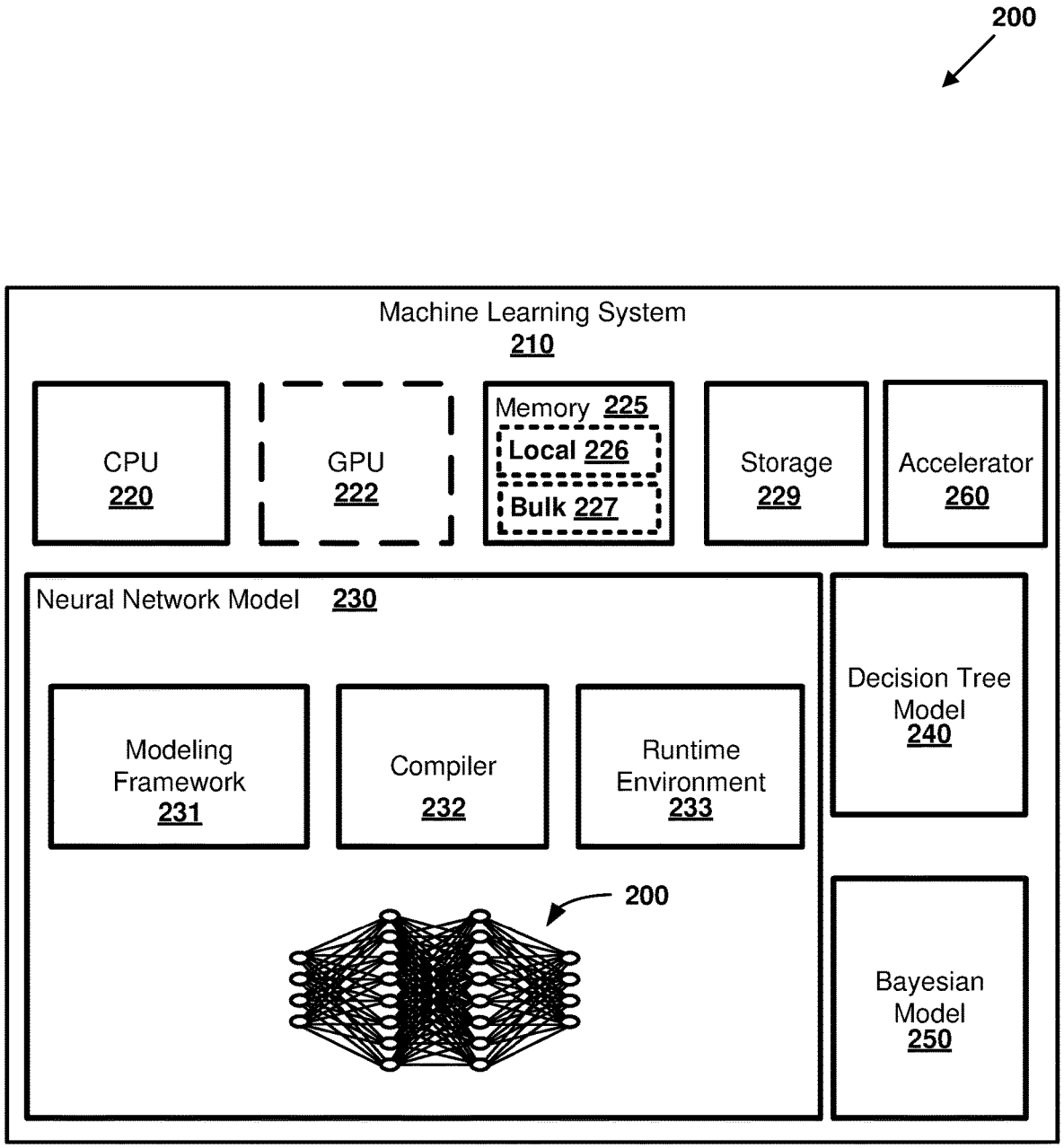
FIG. 2 is a block diagram outlining an example machine learning system as can be implemented in certain examples of the disclosed technology.

V. Example Architectures for Machine Learning Environment with Deep Learned Models FIG. 2 is a block diagram 200 outlining an example machine learning system 210 as can be implemented in certain examples of the disclosed technology, including for training and using neural networks (e.g., by generating inferences from provided input). As shown in FIG. 2, the machine learning system 210 can include a number of hardware resources including general-purpose processors 220 and special-purpose processors such as graphics processing units 222 and neural network accelerator 260. The processors are coupled to memory 225 and storage 229, which can include volatile or non-volatile memory devices. The processors 220 and 222 execute instructions stored in the memory or storage in order to provide one or more types of different machine learning modules, including a neural network model 230, a decision tree model 240, and/or a Bayesian model 250. The neural network model 230 includes software interfaces that allow the system to be programmed to implement various types of machine learning models. For example, the neural network model 230 can provide software functions can be provided that allow applications to define neural networks including weights, biases, activation functions, node values, and interconnections between layers of a neural network. Additionally, software functions can be used to define state elements for recurrent neural networks. The neural network model 230 can further provide utilities to allow for training and retraining of a neural network implemented with the module. Values representing the neural network module are stored in memory or storage and are operated on by instructions executed by one of the processors. The values stored in memory or storage can be represented using integer values, normal-precision floating-point values, quantized floating-point values, block floating point values, and/or fixed-point values.

In some examples, proprietary or open source libraries or frameworks are provided to a programmer to implement neural network creation, training, and evaluation. Examples of such libraries include TensorFlow, Microsoft Cognitive Toolkit (CNTK), Microsoft Project Brainwave, Caffe, Theano, and Keras. In some examples, programming tools such as integrated development environments provide support for programmers and users to define, compile, and evaluate NNs.

Any of the machine learning models, including the models 230, 240, and/or 250 can be implemented using an accelerator 260, such as a custom or application-specific integrated circuit (e.g., including a system-on-chip (SoC) integrated circuit), as a field programmable gate array (FPGA) or other reconfigurable logic, or as a soft processor virtual machine hosted by a physical, general-purpose processor. The accelerator 260 can include a tensor processing unit, reconfigurable logic devices, and/or one or more neural processing cores. The accelerator 260 can be configured to implement the machine learning models in hardware, software, or a combination of hardware and software. As one example, the accelerator 260 can be configured and/or executed using instructions executable on a tensor processing unit. As another example, the accelerator 260 can be configured by programming reconfigurable logic blocks. As another example, the accelerator 260 can be configured using hard-wired logic gates.

The neural network model 230 can be programmed to execute a subgraph, an individual layer, or a plurality of layers of a neural network. For example, the neural network model 230 can be programmed to perform operations for all or a portion of a layer of a NN, including private domain and public domain portions. The neural network model 230 can access a local memory used for storing weights, biases, input values, output values, forget values, state values, and so forth. The neural network model 230 can have many inputs, where each input can be weighted by a different weight value. For example, the neural network model 230 can produce a dot product of an input tensor and the programmed input weights. In some examples, the dot product can be adjusted by a bias value before it is used as an input to an activation function. The output of the neural network model 230 can be stored in the local memory, where the output value can be accessed and sent to a different NN processor core and/or to a different machine learning model (e.g., models 240 or 250) or the memory 225. Intermediate values used by a machine learning module can often be stored in a smaller or more local memory, while values that may not be needed until later in a training process can be stored in a "bulk memory" a larger, less local memory (or storage device, such as on an SSD (solid state drive) or hard drive). For example, during training forward propagation, once activation values for a next layer in the NN have been calculated, those values may not be accessed until for propagation through all layers has completed. Such activation values can be stored in such a bulk memory.

The machine learning system can include a plurality of accelerators 260 that are connected to each other via an interconnect (not shown). The interconnect can carry data and control signals between individual accelerators, a memory interface (not shown), and an input/output (I/O) interface (not shown). The interconnect can transmit and receive signals using electrical, optical, magnetic, or other suitable communication technology and can provide communication connections arranged according to a number of different topologies, depending on a particular desired configuration. For example, the interconnect can have a crossbar, a bus, a point-to-point bus, or other suitable interconnect topology. In some examples, any one of the plurality of central processing units (CPUs) 220, graphics processing units (GPUs) 222, or accelerators 260 can be connected to any of the other cores, while in other examples, some cores are only connected to a subset of the other cores. For example, each core may only be connected to a nearest 4, 8, or 20 neighboring cores. The interconnect can be used to transmit input/output data to and from the cores and accelerators, as well as transmit control signals and other information signals to and from the cores and accelerators. For example, each of the cores or accelerators can receive and transmit semaphores that indicate the execution status of operations currently being performed by each of the respective cores or accelerators. Further, matrix and vector values can be shared via the interconnect. In some examples, the interconnect is implemented as wires connecting the cores, accelerators, and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from cores, accelerators, and memory implementing the machine learning modules are not limited to full swing electrical digital signals, but can be configured to include differential signals, pulsed signals, or other suitable signals for transmitting data and control signals. In some examples, the machine learning system 210 can include an emulator that emulates functions of the accelerator 260.

The neural network model 230 can be used to specify, train, and evaluate a neural network model using a tool flow that includes a hardware-agnostic modelling framework 231 (also referred to as a native framework or a machine learning execution engine), a neural network compiler 232, and a neural network runtime environment 233. The memory includes computer-executable instructions for the tool flow including the modelling framework 231, the neural network compiler 232, and the neural network runtime environment 233. The tool flow can be used to generate neural network data representing all or a portion of the neural network model, such as the neural network model discussed below regarding FIG. 2. It should be noted that while the tool flow is described as having three separate tools (231, 232, and 233), the tool flow can have fewer or more tools in various examples. For example, the functions of the different tools (231, 232, and 233) can be combined into a single modelling and execution environment. In other examples, where a neural network accelerator is deployed, such a modeling framework may not be included.

The neural network data can be stored in the memory 225, which can include local memory 226, which is typically implemented as static read only memory (SRAM), embedded dynamic random access memory (eDRAM), in latches or flip-flops in a register file, in a block RAM, or other suitable structure, and bulk memory 227, which is typically implemented in memory structures supporting larger, but often slower access than the local memory 226. For example, the bulk memory may be off-chip dynamic random access memory (DRAM), network accessible RAM, solid state (SSD) drives, hard drives, or network-accessible storage. Depending on a particular memory technology available, other memory structures, including the foregoing structures recited for the local memory, may be used to implement bulk memory. The neural network data can be represented in one or more formats. For example, the neural network data corresponding to a given neural network model can have a different format associated with each respective tool of the tool flow. Generally, the neural network data can include a description of nodes, edges, groupings, weights, biases, activation functions, and/or tensor values. As a specific example, the neural network data can include source code, executable code, metadata, configuration data, data structures and/or files for representing the neural network model.

The modelling framework 231 can be used to define and use a neural network model. As one example, the modelling framework 231 can include pre-defined APIs and/or programming primitives that can be used to specify one or more aspects of the neural network model. The pre-defined APIs can include both lower-level APIs (e.g., activation functions, cost or error functions, nodes, edges, and tensors) and higher-level APIs (e.g., layers, convolutional neural networks, recurrent neural networks, linear classifiers, and so forth). "Source code" can be used as an input to the modelling framework 231 to define a topology of the graph of a given neural network model. In particular, APIs of the modelling framework 231 can be instantiated and interconnected within the source code to specify a complex neural network model. A data scientist can create different neural network models by using different APIs, different numbers of APIs, and interconnecting the APIs in different ways.

In addition to the source code, the memory 225 can also store training data. The training data includes a set of input data for applying to the neural network model and a desired output from the neural network model for each respective dataset of the input data. The modelling framework 231 can be used to train the neural network model with the training data. An output of the training is the weights and biases that are associated with each node of the neural network model. After the neural network model is trained, the modelling framework 231 can be used to classify new data that is applied to the trained neural network model. Specifically, the trained neural network model uses the weights and biases obtained from training to perform classification and recognition tasks on data that has not been used to train the neural network model. The modelling framework 231 can use the CPU 220 and the special-purpose processors (e.g., the GPU 222 and/or the accelerator 260) to execute the neural network model with increased performance as compare with using only the CPU 220. In some examples, the performance can potentially achieve real-time performance for some classification tasks.

The compiler 232 analyzes the source code and data (e.g., the examples used to train the model) provided for a neural network model and transforms the model into a format that can be accelerated on the accelerator 260, which will be described in further detail below. Specifically, the compiler 232 transforms the source code into executable code, metadata, configuration data, and/or data structures for representing the neural network model and memory as neural network data. In some examples, the compiler 232 can divide the neural network model into portions using the CPU 220 and/or the GPU 222) and other portions (e.g., a subgraph, an individual layer, or a plurality of layers of a neural network) that can be executed on the accelerator 260. The compiler 232 can generate executable code (e.g., runtime modules) for executing NNs assigned to the CPU 220 and for communicating with a subgraph, an individual layer, or a plurality of layers of a neural network assigned to the accelerator 260. The compiler 232 can generate configuration data for the accelerator 260 that is used to configure accelerator resources to evaluate the subgraphs assigned to the optional accelerator 260. The compiler 232 can create data structures for storing values generated by the neural network model during execution and/or training and for communication between the CPU 220 and the accelerator 260. The compiler 232 can generate metadata that can be used to identify subgraphs, edge groupings, training data, and various other information about the neural network model during runtime. For example, the metadata can include information for interfacing between the different subgraphs or other portions of the neural network model.

The runtime environment 233 provides an executable environment or an interpreter that can be used to train the neural network model during a training mode and that can be used to evaluate the neural network model in training, inference, or classification modes. During the inference mode, input data can be applied to the neural network model inputs and the input data can be classified in accordance with the training of the neural network model. The input data can be archived data or real-time data.

The runtime environment 233 can include a deployment tool that, during a deployment mode, can be used to deploy or install all or a portion of the neural network to accelerator 260. The runtime environment 233 can further include a scheduler that manages the execution of the different runtime modules and the communication between the runtime modules and the accelerator 260. Thus, the runtime environment 233 can be used to control the flow of data between nodes modeled on the neural network model 230 and the neural accelerator 260.

The neural network model can also specify additional operations that may be desirable in particular neural network implementations can be performed based including adding a bias to one or more nodes of a neural network, applying a hyperbolic tangent function or other such sigmoid function, or rectification functions (e.g., ReLU operations) or a Gaussian function.

The machine learning accelerator 260 may be used to accelerate evaluation and/or training of a neural network graph or subgraphs, typically with increased speed and reduced latency that is not realized when evaluating the subgraph using only the CPU 220 and/or the GPU 222. The accelerator 260 can include configuration logic which provides a soft CPU. The soft CPU supervises operation of the accelerated graph or subgraph on the accelerator 260 and can manage communications with the neural network model 230. The soft CPU can also be used to configure logic and to control loading and storing of data from RAM on the accelerator, for example in block RAM within an FPGA.

In some examples, parameters of the machine learning accelerator 260 can be programmable. The machine learning accelerator 260 can be used to prototype training, inference, or classification of all or a portion of the neural network model. For example, training parameters can be selected based on accuracy or performance results obtained by prototyping the network within the machine learning accelerator 260. After a desired set of training parameters is selected, a model can be programmed into the machine learning accelerator 260 for performing further operations.

VI. Example DNN with Private and Public Domains Using Matrix Multiply

Figure 3:
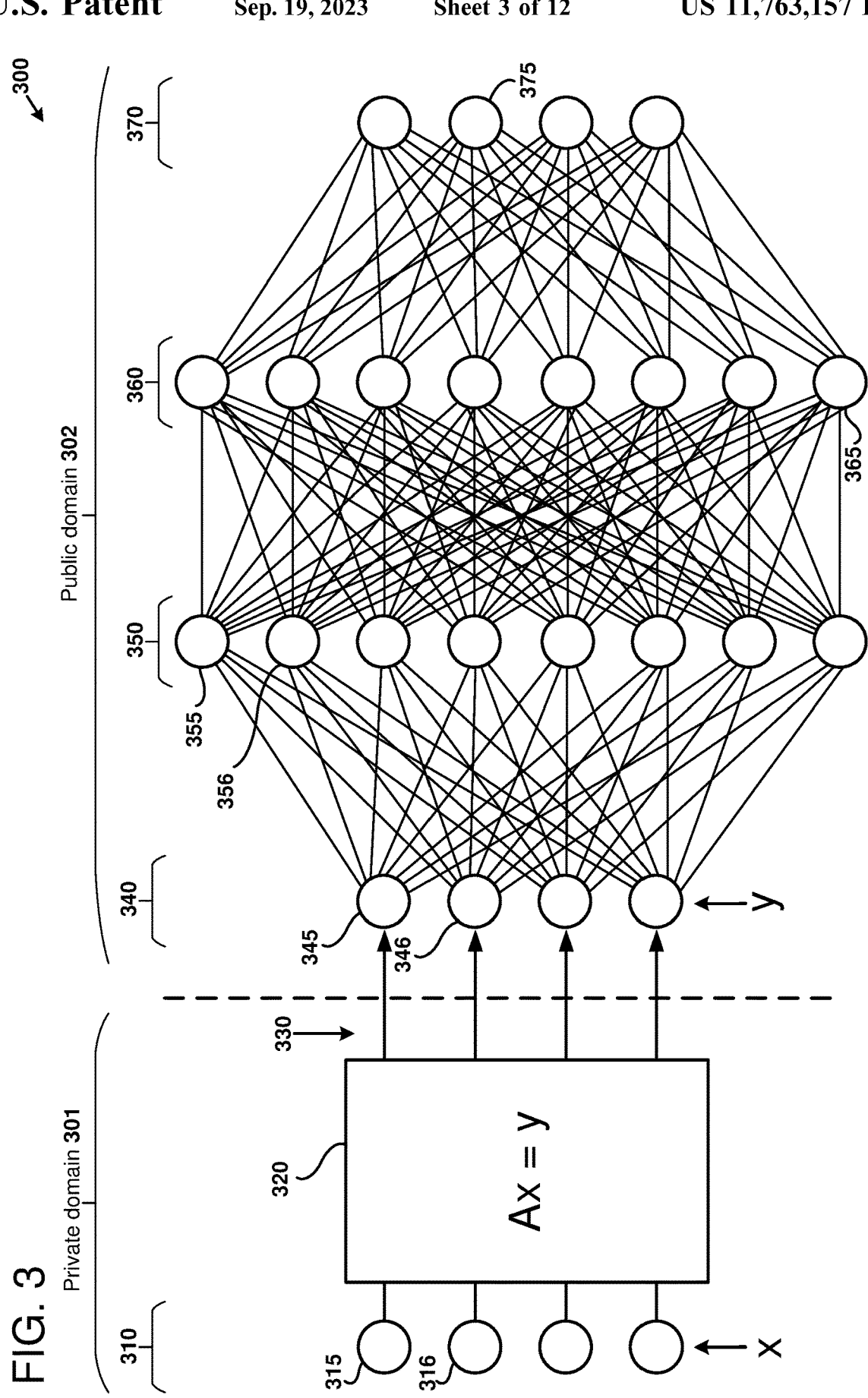
FIG. 3 depicts a deep neural network having private and public domains, as can be implemented in certain examples of the disclosed technology.

FIG. 3 illustrates a simplified topology of a deep neural network (DNN) 300 having a private domain 301 and a public domain 302 that can be used to perform neural network applications, such as enhanced image processing, using disclosed BFP implementations. One or more processing layers can be implemented using disclosed techniques for neural network matrix/vector operations, including the use of one or more of a plurality of machine learning accelerators in the machine learning environment described above regarding FIG. 1. It should be noted that applications of the neural network implementations disclosed herein are not limited to DNNs but can also be used with other types of neural networks, such as convolutional neural networks (CNNs), including implementations having Long Short Term Memory (LSTMs) or gated recurrent units (GRUs), or other suitable artificial neural networks that can be adapted to use BFP methods and apparatus disclosed herein.

The DNN 300 can operate in at least two different modes. Initially, the DNN 300 can be trained in a training mode and then used as a classifier in an inference mode. During the training mode, a set 310 of training data 315, 316, etc. can be received at the private domain 301 of the DNN 300, in other words, by compute resources having private domain access restrictions. As shown, a transformation is applied to the pretransformed set 310 of training data with a scrambler 320 to produce transformed input data 330 that is the result of a matrix multiply:

$$Ax = y \qquad \text{(Eq. 1)}$$

where x is a one-dimensional (n×1) vector for the pretransformed data, A is a two-dimensional (m×n) matrix, and y is a one-dimensional (n×1) vector of the transformed data. In other examples, more than one matrix transformation A can be applied to the input data x. The matrix A or matrices can be stored as a private matrix in a private domain of the computing system to secure the matrix data. The transformed data 330 is applied to public domain set 340 of inputs (e.g., inputs 345, 346, etc.) of the DNN 300 and various parameters of the public domain 302 DNN can be adjusted so that at the completion of training, the DNN 300 can be used as a classifier. The public domain 302 portion of the machine learning model is implemented using compute resources that have less-restrictive access than compute resources of the private domain 301. Training includes performing forward propagation of the training input data, calculating a loss (e.g., determining a difference between an output of the DNN and the expected outputs of the DNN), and performing backward propagation through the DNN to adjust parameters (e.g., weights and biases) of the DNN 300. When an architecture of the DNN 300 is appropriate for classifying the training data, the parameters of the DNN 300 will converge and the training can complete. After training, the DNN 300 can be used in the inference mode. Specifically, training or non-training data can be applied to the inputs of the DNN 300 and forward propagated through the DNN 300 so that the input data can be classified by the DNN 300.

As shown in FIG. 3, the first set 340 of public domain nodes (including nodes 345 and 346) form an input layer. Each node of the set 340 is connected to each node in a first hidden layer formed from a second set 350 of nodes (including nodes 355 and 356). A second hidden layer is formed from a third set 360 of nodes, including node 365. An output layer is formed from a fourth set 370 of nodes (including node 375). In example 300, the nodes of a given layer are fully interconnected to the nodes of its neighboring layer(s). In other words, a layer can include nodes that have common inputs with the other nodes of the layer and/or provide outputs to common destinations of the other nodes of the layer. In other examples, a layer can include nodes that have a subset of common inputs with the other nodes of the layer and/or provide outputs to a subset of common destinations of the other nodes of the layer. In practical applications, large numbers of nodes and additional hidden layers can be used, that are not shown in FIG. 3 for ease of explanation.

During forward propagation, each of the nodes produces an output by applying a weight to each input generated from the preceding node and collecting the weights to produce an output value. In some examples, each individual node can have an activation function (σ) and/or a bias (b) applied. Generally, an appropriately programmed processor or FPGA can be configured to implement the nodes in the depicted neural network 300. In some example neural networks, an output function ƒ(n) of a hidden combinational node n can produce an output expressed mathematically as:

$$f(n) = \sigma\left(\sum_{i=0 \text{ to } E-1} w_i x_i + b\right) \qquad \text{(Eq. 2)}$$

where $w_i$ is a weight that is applied (multiplied) to an input edge $x_i$, b is a bias value for the node n, σ is the activation function of the node n, and E is the number of input edges of the node n. In some examples, the activation function produces a continuous activation value (represented as a floating-point number) between 0 and 1. In some examples, the activation function produces a binary 1 or 0 activation value, depending on whether the summation is above or below a threshold.

A given neural network can include thousands of individual nodes and so performing all of the calculations for the nodes in normal-precision floating-point can be computationally expensive. An implementation for a more computationally expensive solution can include hardware that is larger and consumes more energy than an implementation for a less computationally expensive solution.

Neural networks can be trained and retrained by adjusting constituent values of the output function ƒ(n). For example, by adjusting weights $w_i$ or bias values b for a node, the behavior of the neural network is adjusted by corresponding changes in the networks output tensor values. For example, a cost function C(w, b) can be used during back propagation to find suitable weights and biases for the network, where the cost function can be described mathematically as:

$$C(w, b) = \frac{1}{2n} \sum_x \|y(x) - a\|^2 \qquad \text{(Eq. 3)}$$

where w and b represent all weights and biases, n is the number of training inputs, a is a vector of output values from the network for an input vector of training inputs x. By adjusting the network weights and biases, the cost function C can be driven to a goal value (e.g., to zero (0)) using various search techniques, for examples, stochastic gradient descent. The neural network is said to converge when the cost function C is driven to the goal value.

Examples of suitable practical applications for such neural network implementations according to the disclosed technology include, but are not limited to: performing image recognition, performing speech recognition, classifying images, translating speech to text and/or to other languages, facial or other biometric recognition, natural language processing, automated language translation, query processing in search engines, automatic content selection, analyzing email and other electronic documents, relationship management, biomedical informatics, identifying candidate biomolecules, providing recommendations, or other classification and artificial intelligence tasks.

A network accelerator (such as the network accelerator 260 in FIG. 1) can be used to accelerate the computations of the DNN 300. As one example, the DNN 300 can be partitioned into different subgraphs or network layers that can be individually accelerated. As a specific example, each of the layers 340, 350, 360, and 370 can be a subgraph or layer that is accelerated, with the same or with different accelerators.

In some examples, a set of parallel multiply-accumulate (MAC) units in each convolutional layer can be used to speed up the computation. Also, parallel multiplier units can be used in the fully-connected and dense-matrix multiplication stages. A parallel set of classifiers can also be used. Such parallelization methods have the potential to speed up the computation even further at the cost of added control complexity.

By dividing the neural network model 300 into a private domain 301 and a public domain 302, values used to represent the respective domains can be handled separately. For example, the transform matrix A can be maintained as a secret that is only available to authorized entities. The public domain 302 of the model can be expressed in, for example, and open standard format, and distributed in a less-restricted fashion than the private domain 301. Thus, relatively large public domain machine learning models can be stored and distributed with less protection than the transform matrix A and associated pretransformed training input data. The private domain data can be stored and/or otherwise secured by restricted access using a computer system authentication protocol, being stored in a dynamically-linked library (DLL), or being stored as object code. In some example, the private domain data 301, including the transform matrix and/or pretransformed training data are secured by using operating system permissions, file permissions, password protections, two-factor authentication, encryption, steganography, or other suitable techniques. The public domain data 302 can be stored with less or no protection. In some examples, the public domain data 301 is encrypted, but the public domain data 302 is not.

As will be readily understood to one of ordinary skill in the art having the benefit of the present disclosure, the practical application of neural network implementations can be used for different aspects of using neural networks, whether alone or in combination or subcombination with one another. For example, disclosed implementations can be used for the practical application of implementing neural network training via gradient descent and/or back propagation operations for a neural network. Further, disclosed implementations can be used for evaluation of neural networks.

VII. Example DNN with Private and Public Domains Using Fourier Transform

Figure 4:
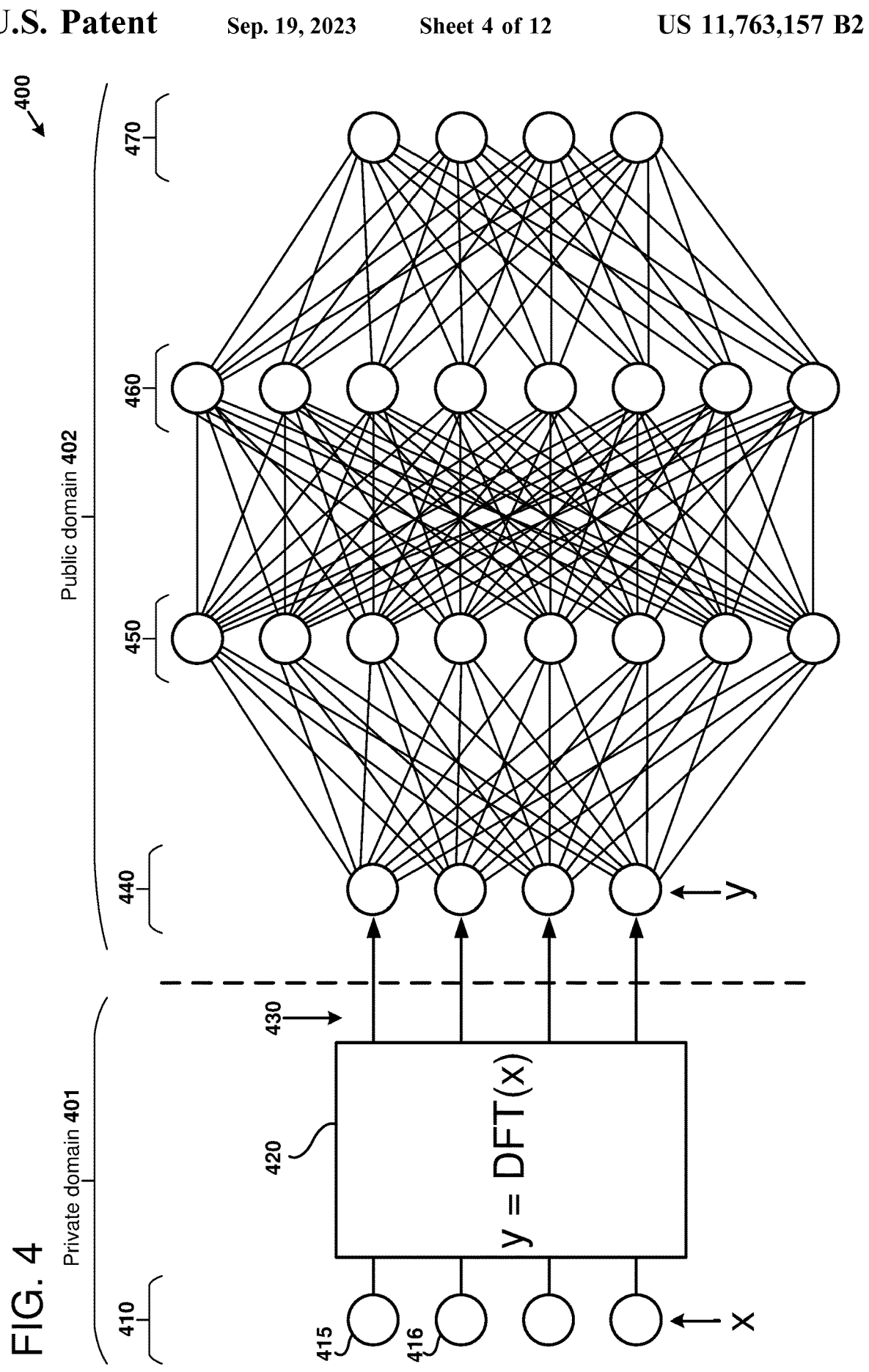
FIG. 4 is a block diagram illustrating an example of a machine learning model that uses a Fourier transform to generate data as can be implemented in certain examples of the disclosed technology.

FIG. 4 is a block diagram representation of a DNN 400 that has a private domain 401 and a public domain 402. In this example, a Fourier transform is used in the private domain to generate transform data for the public domain 402.

As shown, a set 410 of input data including input nodes 415 and 416 are provided to a scrambler 420 comprising a Fourier transform module. In the illustrated example, a discrete Fourier transform is used although in other examples, other techniques for transforming from physical domain to frequency domain can be used, including for example, fast Fourier transform. As an example, small windows of time domain audio data can be transformed to the frequency domain and provided as output 430 to the public domain 402 of the DNN 400. As another example, image data can be transformed from the spatial domain to the frequency domain using a two-dimensional fast Fourier transform. The output 430 is provided to the input nodes 440 of the public domain 402 which can have a number of hidden layers, for example 450 and 460, and an output layer 470. The DNN 400 can be trained in a similar fashion as described above regarding the DNN 300. Thus, if an unauthorized use or attempts to use the public domain 402 neural network, without first transforming the input data using the indicated transform, the results provided at the output 470 will be unused usable, because the public domain 402 DNN was trained using transformed input.

VIII. Example DNN with Private and Public Domains Using Remapping Transform

Figure 5:
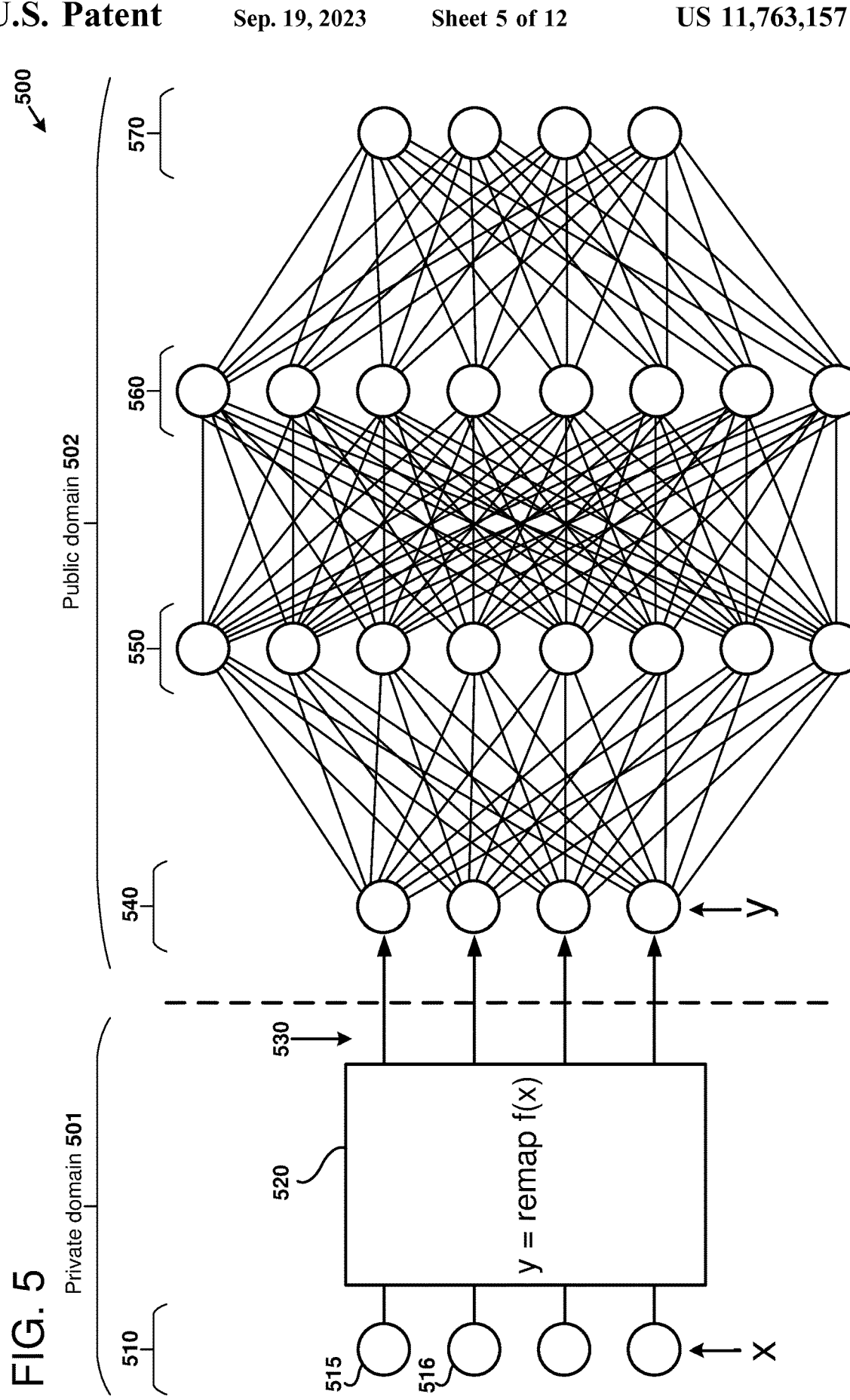
FIG. 5 is a block diagram illustrating an example of a machine learning model that uses a generic remapping, as can be implemented in certain examples of the disclosed technology.

FIG. 5 is a block diagram representation of a DNN 500 that has a private domain 501 and a public domain 502. In this example, any generic remapping function can be used to map the input set 510 to the output 530 of the private domain. For example, a Fourier transform can be used in the private domain to generate transform data for the public domain 502.

As shown, a set 510 of input data including input nodes 515 and 516 are provided to a scrambler 520 including a remapping module. For audio, video, or image data, the input data can be expressed in any suitable domain, including time domain data, frequency domain data, or spatial domain data. In the illustrated example, a discrete Fourier transform is used although in other examples, other techniques can be used that can be readily adapted to disclosed apparatus and methods by one of ordinary skill in the relevant art having the benefit of the present disclosure. For example, any of the following transformations: a Fourier transform, a discrete Fourier transform, a fast Fourier transform, a discrete cosine transform (DCT), a Haar transform, a Taylor series transform, a wavelet transform, or a Hadamard transform can be applied by the scrambler 520 to the input data.

As an example, small windows of time domain audio data can be transformed to the frequency domain and provided as output 530 to the public domain 502 of the DNN 500. As another example, image data can be transformed from the spatial domain to the frequency domain using a two-dimensional fast Fourier transform. In addition to Fourier transform steps such as those described above regarding FIG. 4, the frequency bins of the output 530 can be swapped in the output to further impair unauthorized use of the DNN 500. One example of bin-swapping that can be performed is described in further detail regarding FIGS. 6A and 6B.

Similar to FIGS. 3 and 4, the output 530 is provided to the input nodes 540 of the public domain 502 which can have a number of hidden layers, for example hidden layers 550 and 560, and an output layer 570. The DNN 500 can be trained in a similar fashion as described above regarding the DNN 300. Thus, if an unauthorized use or attempts to use the public domain 502 neural network, without first transforming the input data using the indicated transform, the results provided at the output 570 will be unused usable, because the public domain 502 DNN was trained using transformed input.

Figure 6A:
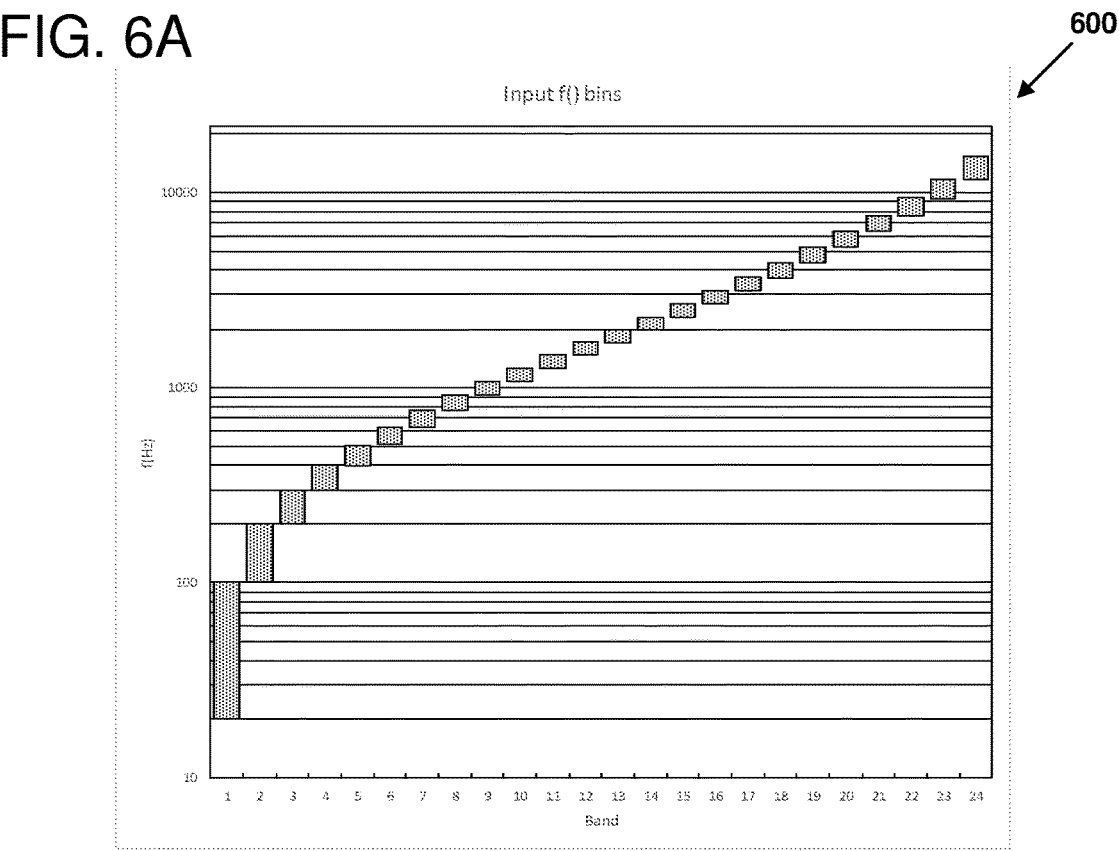
FIGS. 6A and 6B are charts illustrating an example of frequency bin remapping, as can be performed in certain examples of the disclosed technology.
Figure 6B:
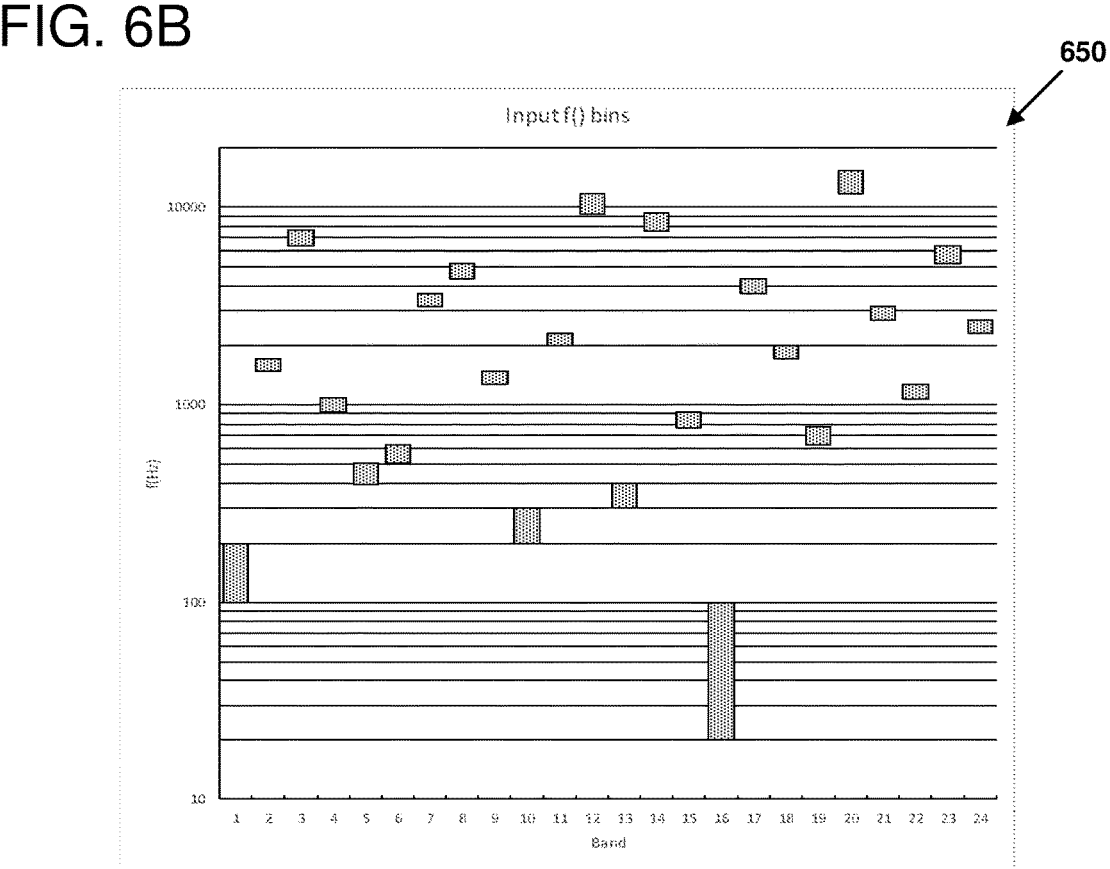

FIGS. 6A and 6B are charts illustrating frequency bins that can be used in conjunction with the transformation discussed above regarding FIG. 5. Each of the frequency bin can have magnitude and/or phase data for a signal for a selected range for a subset of frequencies in the input data to a machine learning model. FIG. 6A is a chart 600 showing 24 frequency bins assigned to a particular range of frequencies according to the Bark-scale. Individual bands of the bins are plotted along the x-axis, while frequency samples corresponding to each bin are plotted on a logarithmic scale on the y-axis. For example, bin 1 corresponds to frequencies in the 20-100 Hz range, bin 2 corresponds to frequencies in the 100-200 Hz range, bin 17 corresponds to frequencies in the 3150 to 3700 Hz range, and so forth. Thus, after a frequency transform is applied to the input data, magnitude and/or phase of the frequency domain signal can be calculated for each of the defined frequency bins.

FIG. 6B is a chart 650 showing the output values 530 after the frequency bins have been rearranged (e.g., using a scrambler). In this example, the frequency bins have been selected at random. The order used to rearrange the frequency bins can be capped as a secret, thereby preventing unauthorized use of the DNN 500. In the illustrated example, bin 1 has been reassigned to bin 16 and the output data 530. Bin 2 has been reassigned to bin 1, bin 17 has been reassigned to bin 7, and so forth. As will be readily understood to one of ordinary skill in the art having the benefit of the present disclosure, the reordering of the bins can be arbitrary, according to a random number generator, or any other suitable method of rearranging the bins. After the frequency bins have been rearranged, training of the neural network 500 can proceed. Thus, the illustrated neural network is secured from unauthorized use, because without knowing the scheme used to rearrange the frequency bins, the output of the neural network will not provide satisfactory results.

IX. Example DNN with Partially-Private Layers

Figure 7:
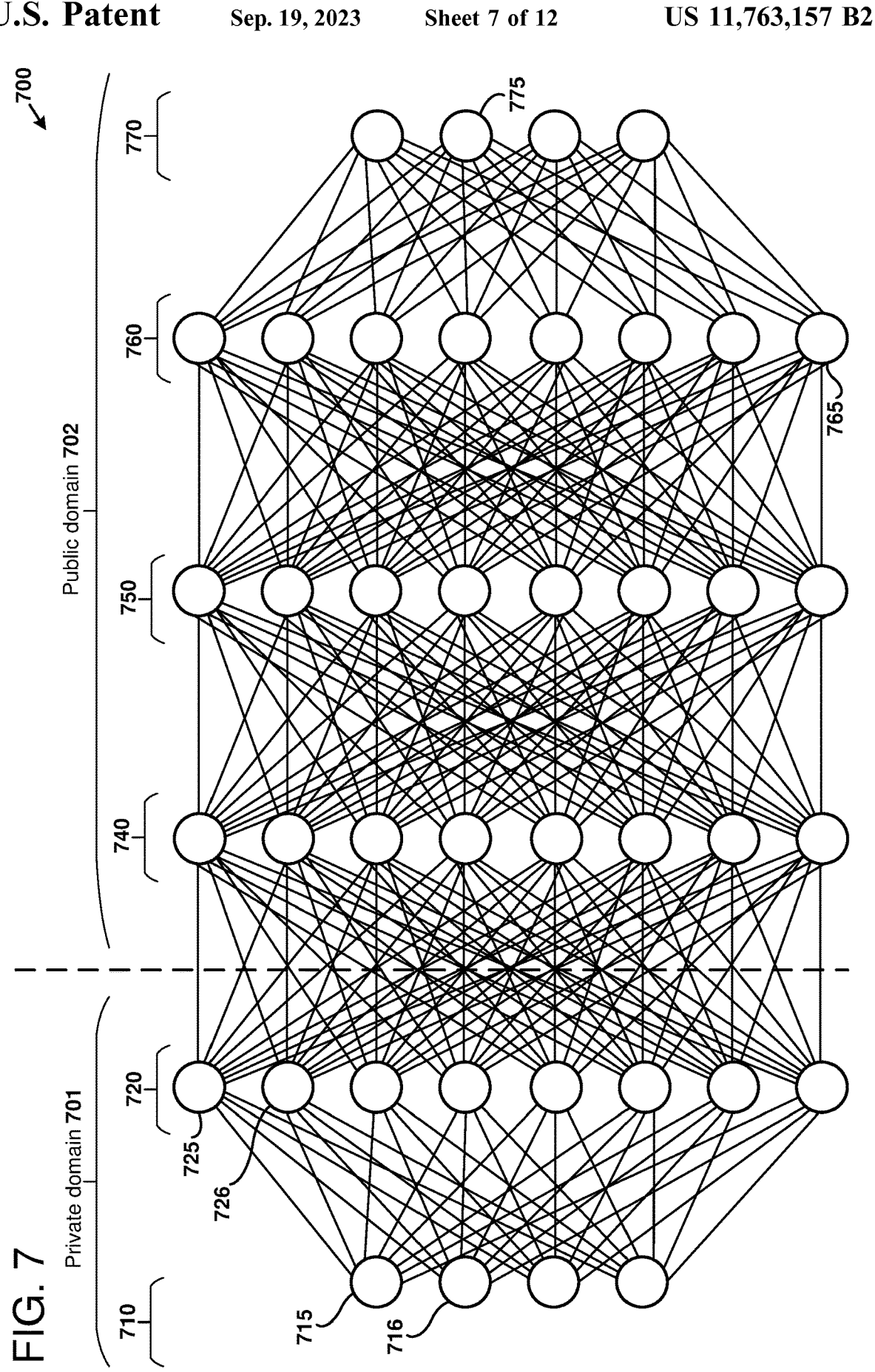
FIG. 7 is a block diagram illustrating an example of a machine learning model that has a number of private domain layers, as can be implemented in certain examples of the disclosed technology.

FIG. 7 is a diagram illustrating a DNN having a private domain 701 and a public domain 702. While similar to the other DNNs in some respects, in this example, two of the layers of the DNN form part of the private domain 701. As shown, the input layer 710 and the first hidden layer 720 act as a scrambler because they are implemented in a private domain. Because the node weights and edge weights in the private domain portion of the DNN (e.g., node weights for input layer nodes 715 and 716 or weights for edges connected to those nodes, or node weights for hidden layers nodes 725 and 725 or weights for edges connected to those nodes) are not available to unauthorized users, it renders the public domain portion unusable unless the first two private layers 710 and 720 are available. The intermediate values provided to the second hidden layer 740 is input to the public domain 702. The public domain 702 also has additional hidden layers 750 and 760 (including node 765), as well as an output layer 770 (including node 775). In some examples, the intermediate values are provided as an edge provided to every node in the public domain 702 (and so the number of intermediate values is on the order of the square of the number of inputs to the private domain 701), while in other examples, the data from the second hidden layer 740 is copied to a single input node of the public domain 702 for each output node of the private domain (and so the number of intermediate values is on the order of the number of inputs to the private domain.

Training of the DNN 700 can occur in a similar fashion as the other DNNs discussed herein. Thus, input data is applied to the first input layer 710 and forward propagated through the layers of the neural network to the output layer 770. Error can be calculated, and then node weights adjusted using back propagation as described herein. When data for the DNN 700 is stored, the private domain 701 can be secured by any suitable means, for example by password protection, operating or computer provided constraints, or encryption. The public domain 702 can be afforded less protection. Thus, the public domain 702 can be stored in an open format that is accessible to third parties, while the private domain is secured, and not visible to others. This can prevent unauthorized use of the DNN 700. While the example of FIG. 7 shows the input layer 710 and first hidden layer 720 as being executed with private domain compute resources, in other examples, other layers can be executed using the private domain. For example, an intermediate hidden layer 750 could be executed in the private domain and the other two portions of the DNN executed using public domain compute resources. Furthermore, an entire layer need not be executed in the private domain, but in some cases, only some nodes of one or more layers are processed using the private domain compute resources.

X. Example Method of Training Machine Learning Model

Figure 8:
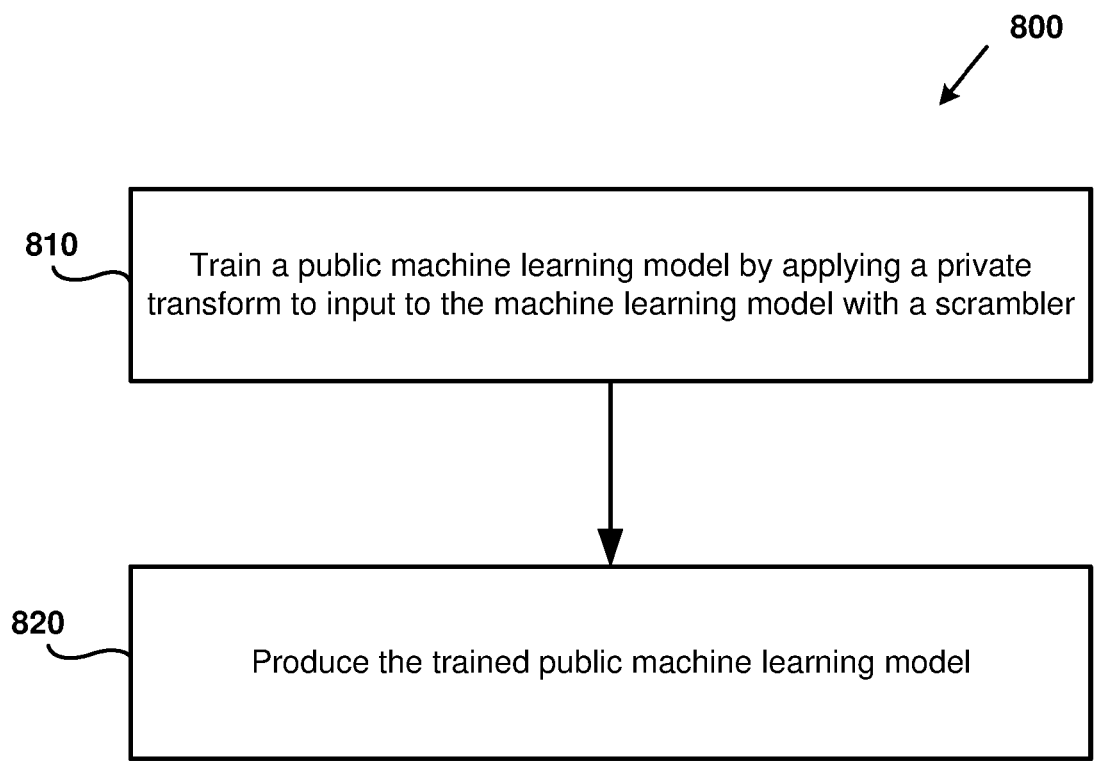
FIG. 8 is a flow chart outlining an example method of training a machine learning model. as can be implemented in certain examples of the disclosed technology.

FIG. 8 is a flow chart 800 outlining an example method of training a machine learning model as can be implemented according to certain examples of the disclosed technology. For example, the method can be implemented using any of the computing hardware disclosed herein.

At process block 810, a public machine learning model is trained by applying the private transformed to input to the machine learning model using a scrambler. For example, any of the techniques and scramblers discussed above including those discussed above for the DNNs 400, 500, and 700, can be employed. The input in the private domain can be transformed by executing a private transformation, producing transformed input. Examples of suitable private transformations include multiplying pretransformed input by a private matrix, applying a Fourier transform, a discrete Fourier transform, a fast Fourier transform, a Taylor series transform, a wavelet transform, or a Hadamard transform. Other examples include transforming physical domain samples in the pretransformed input to frequency domain samples, and moving at least one of the frequency samples to a different position in the transformed output. An example method of moving frequency bin samples is discussed above regarding FIGS. 6A and 6B. In some examples, an additional function comprising at least one of: adding a bias, a hyperbolic tangent function, a sigmoid function, a rectification function, a ReLU function, or a Gaussian function can be performed prior to producing the transformed input. In some examples, the private transform comprises training an input layer and a next layer of an artificial neural network adjust during the training the machine learning model and providing output of the next layer of the artificial network as the transformed input.

A public machine learning model can be trained using the transformed input. For examples, model weights of the public machine learning model can be adjusted using model weights determined by calculating loss for output of the machine learning model using the transformed input. For example, successive acts of performing forward and back propagation with the public domain machine learning model are used to generate a trained public domain machine learning model adapted to receive transformed input.

At process block 820, the trained public machine learning model is produced. Thus, after training the machine learning model, the public portion of the model can be provided in a format that is publicly available, or available with fewer restrictions than the private portion of the machine learning model. The private domain data can be stored and/or otherwise secured by restricted access using a computer system authentication protocol, being stored in a dynamically-linked library (DLL), or being stored as object code. Access to the trained public machine learning model can be less restrictive that access to the private portion of the model. In some examples, the trained public machine learning model is used for generated inferences, for examples, as described below regarding FIG. 9.

XI. Example Method of Using Machine Learning Model

Figure 9:
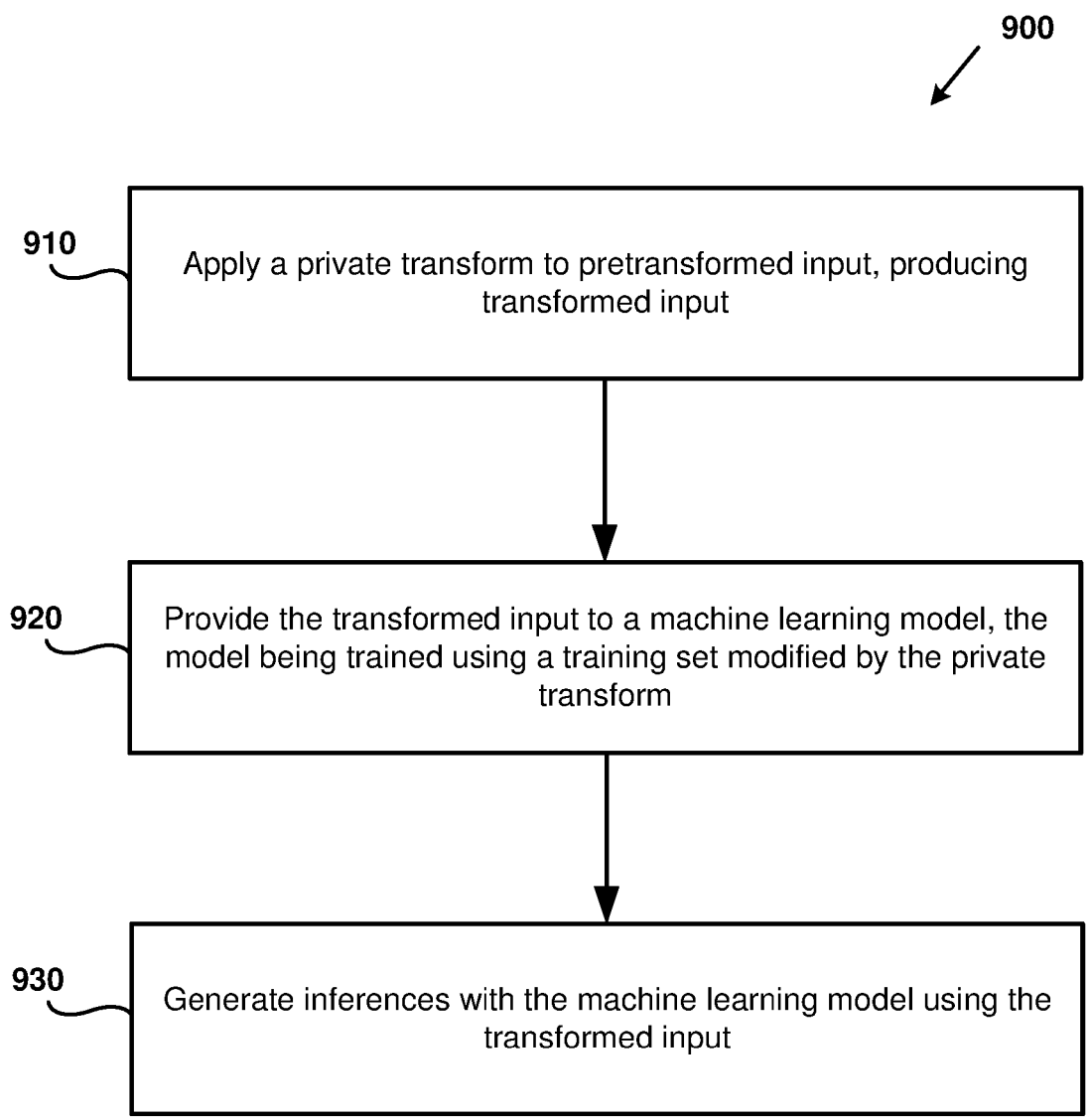
FIG. 9 is a flow chart outlining an example method of using a trained machine learning model. as can be implemented in certain examples of the disclosed technology.

FIG. 9 is a flow chart 900 outlining an example method of using a trained machine learning model as can be implemented according to certain examples of the disclosed technology. For example, the method can be implemented using any of the computing hardware disclosed herein. Output of the trained machine learning model can be used to generate inferences for a given input provided to a private model, which is executed to generate transformed data executed by a public domain machine learning model, which in turn is used to generate at least one output.

At process block 910, a private transform is applied to pretransformed input, thereby producing transformed input to a public machine learning model. For example, any of the techniques discussed above including those discussed above for the DNNs 400, 500, and 700, can be employed to transform the input. Examples of suitable private transformations include multiplying input by a private matrix or applying a Fourier transform, a discrete Fourier transform, a fast Fourier transform, a Taylor series transform, a wavelet transform, or a Hadamard transform. Other examples include transforming physical domain samples in the pretransformed input to frequency domain samples, and moving at least one of the frequency samples to a different position in the transformed output. An example method of moving frequency bin samples is discussed above regarding FIGS. 6A and 6B. In some examples, an additional function comprising at least one of: adding a bias, a hyperbolic tangent function, a sigmoid function, a rectification function, a ReLU function, or a Gaussian function can be performed prior to producing the transformed input. In some examples, the private transform comprises executing an input layer and a next layer of an artificial neural network adjusted during the training the machine learning model and providing output of the next layer of the artificial network as the transformed input.

At process block 920, the transformed input is applied to a machine learning model that was trained using the training set modified by the private transformed used at process block 910. Thus, because the same private transform is used to train the machine learning model, and to apply input to the trained machine learning models to generate inferences, the machine learning model should produce output as expected according to its training.

At process block 930, inferences are generated with the machine learning model using the transformed input. Thus, an output layer of a public machine learning model can be used for a practical application for which the machine learning model was trained.

XII. Example Methods of Using Scrambler with Machine Learning Model

Figure 10:
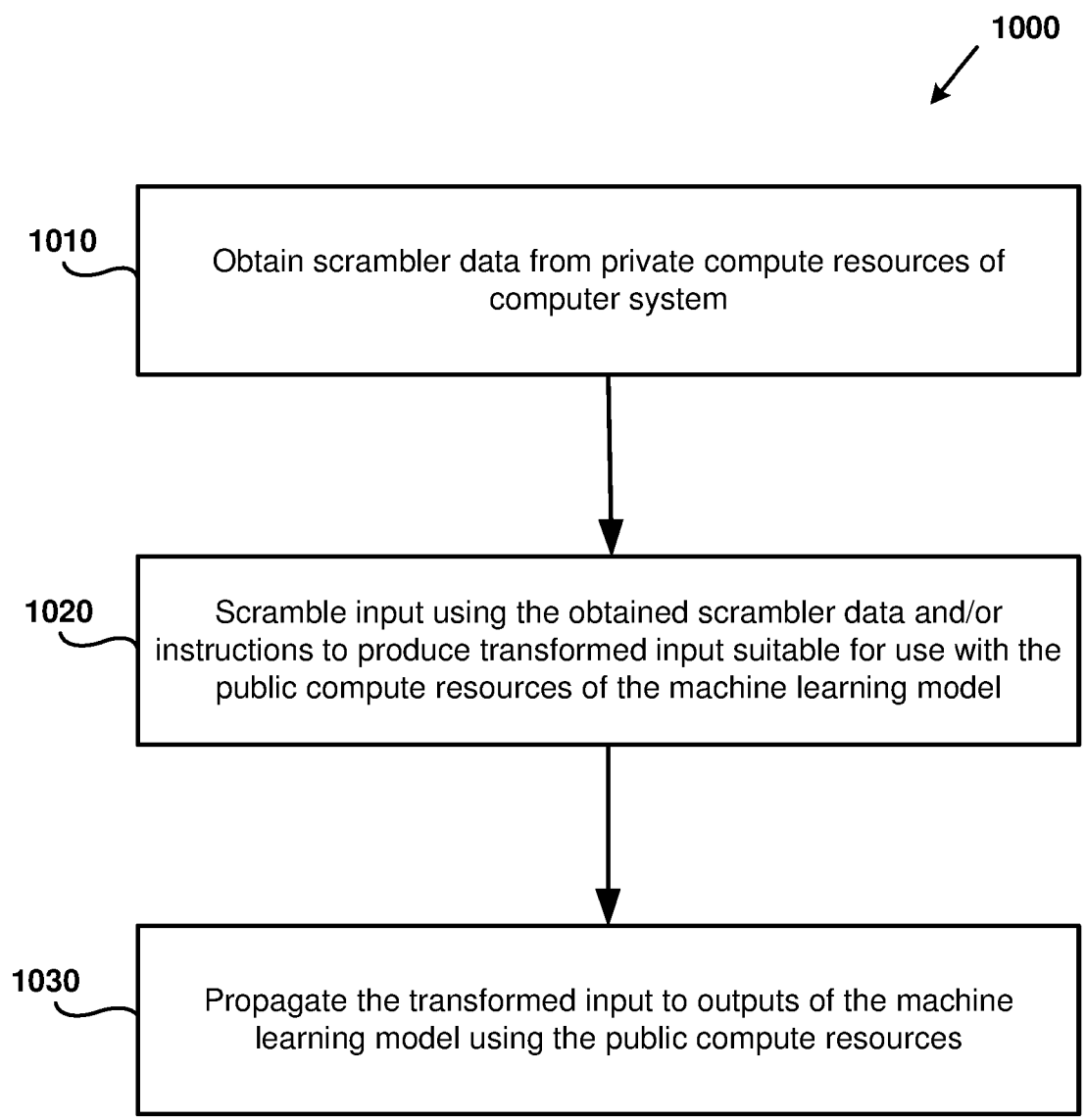
FIG. 10 is a flow chart outlining an example method of executing a machine learning model with a scrambler, as can be implemented in certain examples of the disclosed technology.

FIG. 10 is a flow chart 1000 depicting a method of executing a machine learning model having private and public compute resources, as can be implemented according to certain examples of the disclosed technology. For example, the method can be implemented using any of the computing hardware disclosed herein. The propagated output of the machine learning model can be used to generate inferences for a given input or to train the machine learning model itself.

At process block 1010, scrambler data is obtained from a private compute resource of a computer system. The scrambler data is restricted in some way from being accessed by public compute resources of the computer system. For example, the scrambler data can be restricted using operating system permissions, file permissions, password protections, two-factor authentication, encryption, steganography, or other suitable techniques. The scrambler data can include data such as matrix values, encryption ciphers, specification for scrambler schemes, neural network node and/or edge values, or parameters for implementing transforms or other remappings to the public domain of the machine learning model. The scrambler data can also include computer-executable instructions, keys used to authorize computer-executable instructions, or permissions that allow access to restricted computer-executable instructions. The computer-executable instructions can be executed by a processor of the computing system to implement at least a portion of the scrambler.

At process block 1020, input to the machine learning model is transformed using the scrambler data and/or instructions obtained at process block 1010. For example, the scrambler is implemented using compute resources in the private domain and can include one or more of multiplying the input by a matrix, transforming the input to the frequency domain and scrambling frequency bins, or implementing at least one layer of an artificial neural network using the private domain compute resources. For example, the scrambler can use any of the techniques discussed above including those discussed above for the DNNs 400, 500, and 700. Examples of suitable private transformations include multiplying input by a private matrix or applying a Fourier transform, a discrete Fourier transform, a fast Fourier transform, a Taylor series transform, a wavelet transform, or a Hadamard transform. Other examples include transforming physical domain samples in the pretransformed input to frequency domain samples, and moving at least one of the frequency samples to a different position in the transformed output. An example method of moving frequency bin samples is discussed above regarding FIGS. 6A and 6B. In some examples, an additional function comprising at least one of: adding a bias, a hyperbolic tangent function, a sigmoid function, a rectification function, a ReLU function, or a Gaussian function can be performed prior to producing the transformed input. In some examples, the private transform comprises executing an input layer and a next layer of an artificial neural network adjusted during the training the machine learning model and providing output of the next layer of the artificial network as the transformed input.

At process block 1030, the transformed input is provided to a portion of the model implemented with public compute resources, and the machine learning model is executed to propagate the transformed input to outputs of the machine learning model using the public compute resources. The propagated input can be used to generate inferences for the input data, or for calculating an error and backpropagating the machine learning model to further train the machine learning model.

XIII. Example Methods of Neural Network Training

Figure 11:
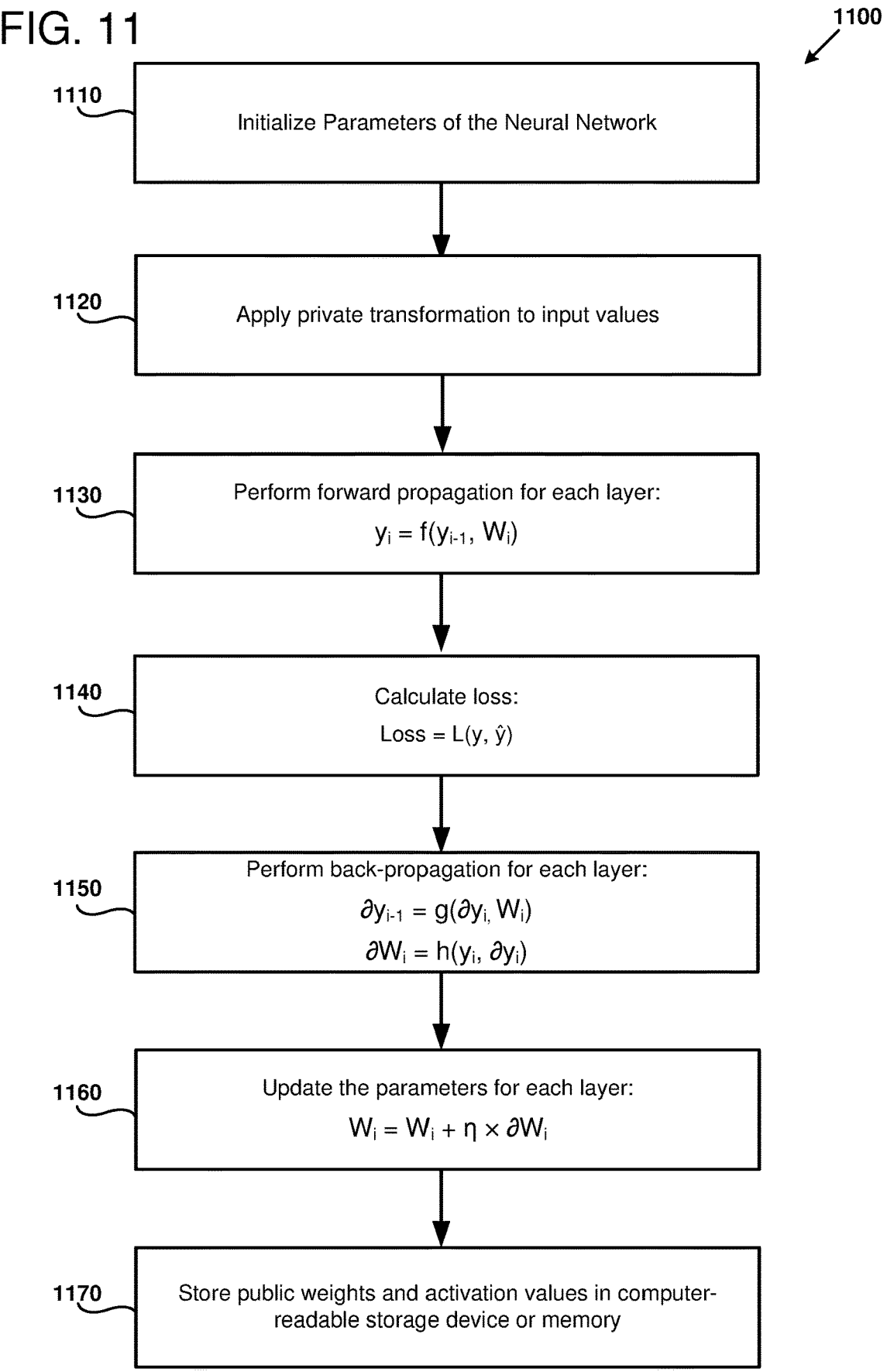
FIG. 11 is a flow chart outlining an example method of training a machine learning model, as can be implemented in certain examples of the disclosed technology.

FIG. 11 is a flow chart 1100 depicting a method of training a neural network, as can be implemented in certain examples of the disclosed technology. For example, training the neural network can include iterating through a set of training data, where the illustrated is used for updating the parameters of the neural network during a given iteration of training data. As one example, the method can be performed by a machine learning system, such as the machine learning environment of FIG. 1.

At process block 1110, parameters, such as weights and biases, of the neural network can be initialized. As one example, the weights and biases can be initialized to random normal-precision floating-point values. As another example, the weights and biases can be initialized to normal-precision floating-point values that were calculated from an earlier training set. The initial parameters can be stored in a memory or storage of the machine learning system. In one example, the parameters can be stored as quantized floating-point values which can reduce an amount of storage used for storing the initial parameters.

At process block 1120, a private transformation is performed on pretransformed input, producing transformed input for use with a public portion of a neural network. For example, the method described above regarding FIG. 8, including any of the specific techniques described regarding FIGS. 4-7, can be used to perform the private transformation.

At process block 1130, input values of the neural network can be forward propagated through the neural network. Input values of a given layer of the neural network can be an output of another layer of the neural network. The values can be passed between the layers from an output of one layer to an input of the next layer using normal-precision floating-point. The output function of the layer i can include an activation value term that is described mathematically as:

$$y_i=f(y_{i-1},W_i) \quad (\text{Eq. 4})$$

where $y_{i-1}$ is the output from a layer providing the input to layer i, $W_i$ is the weight tensor for the layer i, and $f()$ is a forward function of the layer. The output function can include additional terms, such as an activation function or the addition of a bias, that are performed. Generally, the inputs, outputs, and parameters of the layers can be any tensor. Typically, the inputs, outputs, and parameters of the layers will be vectors or matrices. Also at process block 1130, in some examples, a performance metric can be determined for the neural network. In some examples, the performance metric indicates accuracy of the neural network, for example, based on a set of training data. In some examples, the performance metric is based on at least one of the following metrics: a number of true positives, a number of true negatives, a number of false positives, or a number of false negatives generated by the neural network. In some examples, the performance metric is based on entropy of one or more layers of the neural network. In some examples, the performance metric is based on a rate distortion function.

Also at process block 1130, in some examples an adjusted parameter can be selected for the neural network based at least in part on the performance metric determined at process block 1150. For example, any of the parameters initially selected at process block 1110 can be adjusted.

At process block 1140, a loss of the neural network can be calculated. For example, the output y of the neural network can be compared to an expected output ŷ of the neural network. A difference between the output and the expected output can be an input to a cost function that is used to update the parameters of the neural network.

At process block 1150, the loss of the neural network can be back-propagated through the neural network. During back propagation, an output error term ∂y and a weight error term ∂W can be calculated. The output error term can be described mathematically as:

$$\partial y_{i-1}=g(\partial y_i,W_i) \quad (\text{Eq. 5})$$

where $\partial y_{i-1}$ is the output error term from a layer following layer i, $W_i$ is the weight tensor for the layer i, and g() is a backward function of the layer. The backward function g() can be the backward function of f() for a gradient with respect to $y_{i-1}$ or a portion of the gradient function.

The weight error term ∂W can be described mathematically as:

$$\partial W_i=h(y_i,\partial y_i) \quad (\text{Eq. 6})$$

where $\partial W_i$ is the weight error term for the layer i, $\partial y_i$ is the output error term for the layer i, $y_i$ is the output for the layer i, and h() is a backward function of the layer. The backward function h() can be the backward function of f() for a gradient with respect to $W_{i-1}$ or a portion of the weight error equation 6.

At process block 1160, the parameters for each layer can be updated. For example, the weights for each layer can be updated by calculating new weights based on the iteration of training. As one example, a weight update function can be described mathematically as:

$$W_i=W_i+\eta \times \partial W_i \quad (\text{Eq. 7})$$

where $\partial W_i$ is the weight error term for the layer i, $\eta$ is the learning rate for the layer i for the neural network, $W_i$ is the weight tensor for the layer i. In one example, the weight update function can be performed using normal-precision floating-point.

At process block 1170, weights and activation value for the public portion of the neural network can be stored in computer readable storage devices or memory. This data can be stored in a less secure fashion than that used to store the private domain data of the neural network model. For example, in the example of FIG. 7, the layers in the private domain 701 can be stored in encrypted storage, while the other layers in the public domain 72 can be stored in unencrypted storage.

XIV. Example Computing Environment

Figure 12:
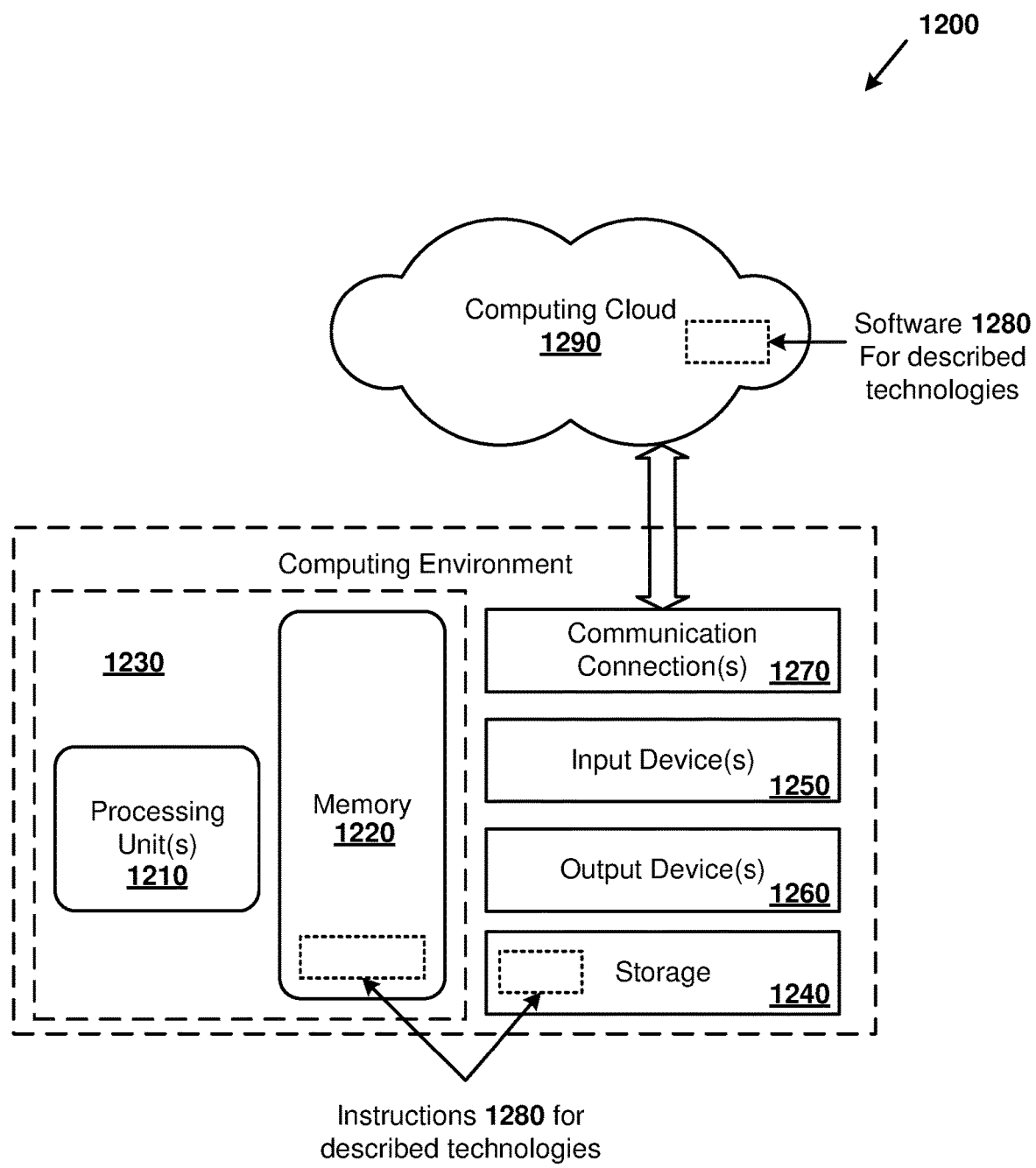
FIG. 12 illustrates a generalized example of a suitable computing environment in which described embodiments, techniques, and technologies can be implemented.

FIG. 12 illustrates a generalized example of a suitable computing environment 1200 in which described embodiments, techniques, and technologies, including training and using machine learning models having private and public domains, can be implemented.

The computing environment 1200 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 12, the computing environment 1200 includes at least one processing unit 1210 and memory 1220. In FIG. 12, this most basic configuration 1230 is included within a dashed line. The processing unit 1210 executes computer-executable instructions and may be a real or a virtual processor. In a multi-processing system, multiple processing units execute computer-executable instructions to increase processing power and as such, multiple processors can be running simultaneously. The memory 1220 may be volatile memory (e.g., registers, cache, RAM), non-volatile memory (e.g., ROM, EEPROM, flash memory, etc.), or some combination of the two. The memory 1220 stores software 1280, images, and video that can, for example, implement the technologies described herein. A computing environment may have additional features. For example, the computing environment 1200 includes storage 1240, one or more input devices 1250, one or more output devices 1260, and one or more communication connections 1270. An interconnection mechanism (not shown) such as a bus, a controller, or a network, interconnects the components of the computing environment 1200. Typically, operating system software (not shown) provides an operating environment for other software executing in the computing environment 1200, and coordinates activities of the components of the computing environment 1200.

The storage 1240 may be removable or non-removable, and includes magnetic disks, magnetic tapes or cassettes, CD-ROMs, CD-RWs, DVDs, or any other medium which can be used to store information and that can be accessed within the computing environment 1200. The storage 1240 stores instructions for the software 1280, which can be used to implement technologies described herein.

The input device(s) 1250 may be a touch input device, such as a keyboard, keypad, mouse, touch screen display, pen, or trackball, a voice input device, a scanning device, or another device, that provides input to the computing environment 1200. For audio, the input device(s) 1250 may be a sound card or similar device that accepts audio input in analog or digital form, or a CD-ROM reader that provides audio samples to the computing environment 1200. The output device(s) 1260 may be a display, printer, speaker, CD-writer, or another device that provides output from the computing environment 1200.

The communication connection(s) 1270 enable communication over a communication medium (e.g., a connecting network) to another computing entity. The communication medium conveys information such as computer-executable instructions, compressed graphics information, video, or other data in a modulated data signal. The communication connection(s) 1270 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed machine learning computing systems. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1290. For example, the disclosed methods can be executed on processing units 1210 located in the computing environment 1230, or the disclosed methods can be executed on servers located in the computing cloud 1290.

Computer-readable media are any available media that can be accessed within a computing environment 1200. By way of example, and not limitation, with the computing environment 1200, computer-readable media include memory 1220 and/or storage 1240. As should be readily understood, the term computer-readable storage media includes the media for data storage such as memory 1220 and storage 1240, and not transmission media such as modulated data signals.

XV. Additional Examples of the Disclosed Technology

Additional examples of the disclosed technology are discussed below with reference to the exemplary methods and apparatus discussed above. In some examples of the disclosed technology, a system of one or more computers can be configured to perform disclosed operations or actions by virtue of having software, firmware, hardware, or a combination of them installed on the system cause the system to perform any of the disclosed operations. One or more computer readable storage devices can store computer-readable instructions that when executed by a computer, cause the computer to perform any disclosed operations or actions. One general aspect includes a computing system adapted to provide access to computing system resources having a plurality of access domains, the plurality of access domains including a public domain and a private domain, the computer system being configured to provide access to the public domain with at least one permissions configuration that does not provide access to the private domain, the computing system including: at least one processor; and computer-readable storage devices and/or memory storing computer-readable instructions that when executed by the at least one processor, cause the computing system to execute a machine learning model using at least the public domain computing system resources, the instructions including: instructions that cause the processor to provide a scrambler by accessing computing system resources that are accessible to the private domain but not to the public domain; instructions that cause the processor to perform a transform operation on input using the provided scrambler to produce transformed input suitable for use with the machine learning model, and instructions that cause the processor to, with computing system resources of the public domain of the processor, perform execution of the machine learning model, the execution including propagating the transformed input to outputs of the machine learning model. Other embodiments of this aspect include corresponding computer systems, apparatus, and computer programs recorded on one or more computer storage devices, each configured to perform the actions of the methods. The computing system can include memory and one or more processors.

Disclosed methods and apparatus can be implemented using any suitable processor which can include any of: general purpose CPUs, graphics processing units, tensor processing units, reconfigurable logic, or field programmable gate arrays. In some examples, the transform operation can include at least one of the following: a Fourier transform, a discrete Fourier transform, a fast Fourier transform, a discrete cosine transform (DCT), a Haar transform, a Taylor series transform, a wavelet transform, or a Hadamard transform. In some examples, an additional function is provided to generate the transformed input, the additional function including applying at least one of: an added bias, a hyperbolic tangent function, a sigmoid function, a rectification function, a ReLU function, or a Gaussian function.

In some examples, the computing system provides different permissions configurations for accessing the private domain compute resources and the public domain compute resources by at least one of the following: securing data used to produce the transformed input in the private domain, encrypting data used to produce the transformed input in the private domain, requiring authentication before allowing the instructions that provide the input transformation to execute, or storing at least some of the instructions that cause the processor to produce transformed input in an object code file not accessible in the public domain. In some examples, access is restricted in machine learning models including artificial neural networks by storing the input layer nodes and the next layer nodes of the private domain in a computer-readable storage device or memory secured by: a computer system authentication protocol, being stored in a dynamically-linked library (DLL), or being stored as object code and storing data for at least a portion of the remaining nodes in a computer-readable storage device or memory accessible via the public domain.

Certain examples of disclosed computing systems can include one or more of the following features. The computing system can include one or more tangible computer-readable storage media storing computer-executable instructions that cause the processor to perform training reconfiguration of the machine learning model by: forward propagating the transformed input to outputs of the machine learning model. The instructions can also cause the computing system to determine errors between expected values of the outputs and the machine learning model outputs. The instructions can also cause the computing system to adjust at least one parameter of the machine learning model based on the determined errors and repeatedly perform the training reconfiguration until a metric of the determined errors exceeds a predetermined threshold. Computer-readable storage devices and/or memory can further include: instructions that cause the processor to generate a prediction for the input based on at least one of the outputs, the outputs being generated by forward propagating the transformed input to outputs of the machine learning model. The computer-readable storage devices and/or memory can further include: instructions that cause the computing system to perform the transform operation with a matrix provided by the scrambler using the private domain computing resources, access to the matrix being restricted from the public domain computing resources. In some examples, the input is expressed in a physical domain and the transformed input is in a frequency domain. In some examples, the transformed input includes rearranged samples of the frequency domain, the samples being rearranged using the scrambler. Computer-readable storage devices and/or memory can further include: instructions that cause the processor to obtain a decryption key from the private domain compute resources. The storage devices and/or memory can also include instructions that cause the processor to perform the transform by decrypting data and/or instructions to provide the scrambler from a computer-readable storage device or memory with the decryption key. In some examples, the machine learning model is an artificial neural network, and the scrambler provides an input layer and nodes for a next layer of the artificial neural network that are accessible to computing system resources accessible to the private domain but not accessible to the public domain, and at least some of the remaining nodes of the artificial neural network are accessible to computing system resources of the public domain.

In some examples of the disclosed technology, a method of operating a computing system having private compute resources and public compute resources is performed with a processor of the computing system executing a machine learning model. The method can include, with the computing system, obtaining scrambler data from a private compute resource, the scrambler data being restricted from being accessed by the public compute resources. The method also includes scrambling input using the obtained scrambler data to produce transformed input suitable for use with the public compute resources of the machine learning model. The method also includes propagating the transformed input to outputs of the machine learning model using the public compute resources. Other examples include corresponding computer systems, apparatus, and computer-readable storage media for performing disclosed methods.

Certain examples of the method can include one or more of the following aspects. In some examples, the machine learning model is an artificial neural network, and the method further includes training the artificial neural network by: repeatedly adjusting weights and/or activation functions for at least one node of the artificial neural network, the adjusted weights and/or activation functions being determined by calculating loss for the outputs produced by the propagating using the transformed input; and storing data representing the adjusted weights and/or activation functions in a computer-readable storage device or medium. In some examples, the method further includes generating inferences with the machine learning model by: outputting at least one predication for the input based on the outputs produced by the propagating using the transformed input. In some examples, the scrambler data includes a decryption key; and the scrambling includes using the decryption key to move, transpose, and/or substitute data for at least a portion of the input. In some examples, the scrambler data includes data, computer-executable instructions, or data and computer-executable instructions used to perform scrambling the input. In some examples, the method further includes encrypting the scrambler data. In some examples, the method further includes storing the encrypted scrambler data in a computer-readable storage device or medium. In some examples, scrambling the input includes multiplying the input by a matrix produced from the obtained scrambler data. In some examples, the machine learning model is an artificial neural network. In some examples, scrambling the input uses the private compute resource to provide nodes for an input layer and nodes for at least a next layer of the artificial neural network. In some examples, the method further includes propagating the transformed input using the public compute resources, but not the private compute resource, to process node values for the remaining nodes of the artificial neural network. In some examples, the method further includes storing data representing at least a portion of the input layer nodes or the next layer nodes in a proprietary format in a computer-readable storage device or medium that has access to the public compute resources restricted. The method may also include storing data representing at least a portion of the remaining nodes in an open source format in a computer-readable storage device or medium accessible by the public compute resources. In some examples, the method uses input including any one or more of: audio data, image data, and/or video data; and the scrambling the input includes transforming the audio data, image data, and/or video data to a proprietary feature domain. In some examples, the scrambling the input includes: transforming physical domain samples in the input to frequency domain samples. In some examples, the method further includes moving at least one of the frequency domain samples to a different position in the transformed input.

In some examples of the disclosed technology, one or more computer-readable storage media store data and/or instructions for an artificial neural network having a public domain and a private domain, the data and/or instructions including at least one of: private domain computer-executable instructions, which when executed cause a computer system to transform input into transformed input suitable for propagating through the artificial neural network. In some examples, the one or more computer-readable storage media storing data and/or instructions also include private domain data, which when applied as the input, is rendered suitable for propagating through the artificial neural network by the private domain computer-executable instructions. In some examples, the one or more computer-\readable storage media store data and/or instructions also includes public domain computer-executable instructions, which when executed cause a computer system to propagate transformed input through the artificial neural network to generate predictions for the input. In some examples, the computer-readable storage media storing data and/or instructions also includes public domain data representing at least a portion of nodes of the artificial neural network, which, when the public domain of the artificial neural network receives input rendered suitable for the public domain, generates output used to generate predictions for the input.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

What is claimed is:

1. A computing system adapted to provide access to computing system resources having a plurality of access domains, the plurality of access domains comprising a public domain and a private domain, the computer system being configured to provide access to the public domain with at least one permissions configuration that does not provide access to the private domain, the computing system comprising:
    at least one processor; and
    computer-readable storage devices and/or memory storing computer-readable instructions that when executed by the at least one processor, cause the computing system to execute a machine learning model using at least the public domain computing system resources, the instructions comprising:
        instructions that cause the processor to provide a scrambler by accessing computing system resources that are accessible to the private domain but not to the public domain,
        instructions that cause the processor to perform a transform operation on input using the provided scrambler to produce transformed input suitable for use with the machine learning model, the transform operation being performed with a matrix provided by the scrambler using the private domain computing resources, access to the matrix being restricted from the public domain computing resources, and
        instructions that cause the processor to, with computing system resources of the public domain of the processor, perform execution of the machine learning model, the execution comprising propagating the transformed input provided by the scrambler to outputs of the machine learning model.

2. The computing system of claim 1, the instructions further comprising:
    instructions that cause the processor to perform training reconfiguration of the machine learning model by:
    forward propagating the transformed input to outputs of the machine learning model,
    determining errors between expected values of the outputs and the machine learning model outputs, and
    adjusting at least one parameter of the machine learning model based on the determined errors; and
    instructions that cause the processor to repeatedly perform the training reconfiguration until a metric of the determined errors exceeds a predetermined threshold.

3. The computing system of claim 1, wherein the computer-readable storage devices and/or memory further comprise:
    instructions that cause the processor to generate a prediction for the input based on at least one of the outputs, the outputs being generated by forward propagating the transformed input to outputs of the machine learning model.

4. The computing system of claim 1, wherein:
    the input is expressed in a physical domain and the transformed input is in a frequency domain; and
    the transformed input comprises rearranged samples of the frequency domain, the samples being rearranged using the scrambler.

5. The computing system of claim 1, wherein the instructions that cause the processor to provide the scrambler include:
    instructions that cause the processor to obtain a decryption key from the private domain compute resources; and
    instructions that cause the processor to perform the transform by decrypting data and/or instructions to provide the scrambler from a computer-readable storage device or memory with the decryption key.

6. The computing system of claim 1, wherein the machine learning model is an artificial neural network, and wherein the scrambler provides an input layer and nodes for a next layer of the artificial neural network that are accessible to computing system resources accessible to the private domain but not accessible to the public domain, and wherein at least some of the remaining nodes of the artificial neural network are accessible to computing system resources of the public domain.

7. A method of operating a computing system having private compute resources and public compute resources, the method being performed with a processor of the computing system executing a machine learning model, the method comprising:
    by the computing system:
        obtaining scrambler data from a private compute resource, the scrambler data being restricted from being accessed by the public compute resources, the scrambler data comprising a decryption key;
        scrambling input using the obtained scrambler data to produce transformed input suitable for use with the public compute resources of the machine learning model, the scrambling comprising using the decryption key to move, transpose, and/or substitute data for at least a portion of the input; and
        propagating the transformed input produced using the obtained scrambler data to outputs of the machine learning model using the public compute resources.

8. The method of claim 7, wherein the machine learning model is an artificial neural network, and wherein the method further comprises training the artificial neural network by:
repeatedly adjusting weights and/or activation functions for at least one node of the artificial neural network, the adjusted weights and/or activation functions being determined by calculating loss for the outputs produced by the propagating using the transformed input; and
storing data representing the adjusted weights and/or activation functions in a computer-readable storage device or medium.

9. The method of claim 7, further comprising generating inferences with the machine learning model by:
outputting at least one prediction for the input based on the outputs produced by the propagating using the transformed input.

10. The method of claim 7, wherein the scrambler data comprises data, computer-executable instructions, or data and computer-executable instructions used to perform scrambling the input, the method further comprising:
encrypting the scrambler data; and
storing the encrypted scrambler data in a computer-readable storage device or medium.

11. The method of claim 7, wherein the scrambling the input comprises multiplying the input by a matrix produced from the obtained scrambler data.

12. The method of claim 7, wherein:
the machine learning model is an artificial neural network;
the scrambling the input uses the private compute resource to provide nodes for an input layer and nodes for at least a next layer of the artificial neural network; and
the propagating the transformed input comprises using the public compute resources, but not the private compute resource, to process node values for the remaining nodes of the artificial neural network.

13. The method of claim 12, further comprising:
storing data representing at least a portion of the input layer nodes or the next layer nodes in a proprietary format in a computer-readable storage device or medium that has access to the public compute resources restricted; and
storing data representing at least a portion of the remaining nodes in an open source format in a computer-readable storage device or medium accessible by the public compute resources.

14. The method of claim 12, wherein:
the input comprises audio data, image data, and/or video data; and
the scrambling the input comprises transforming the audio data, image data, and/or video data to a proprietary feature domain.

15. The method of claim 12, wherein the scrambling the input comprises:
transforming physical domain samples in the input to frequency domain samples; and
moving at least one of the frequency domain samples to a different position in the transformed input.

16. One or more computer-readable storage media storing computer-readable instructions, which when executed, cause a computer system to perform a method of operating the computing system, the computing system having private compute resources and public compute resources, the method being performed with a processor of the computing system executing a machine learning model, the machine learning model being an artificial neural network, the method comprising:
by the computing system:
obtaining scrambler data from a private compute resource, the scrambler data being restricted from being accessed by the public compute resources, the scrambler data comprising a decryption key;
scrambling input using the obtained scrambler data to produce transformed input suitable for use with the public compute resources of the machine learning model, the scrambling comprising using the decryption key to move, transpose, and/or substitute data for at least a portion of the input, the scrambling further comprising using the private compute resource to provide nodes for an input layer and nodes for at least a next layer of the artificial neural network; and
propagating the transformed input produced using the obtained scrambler data to outputs of the machine learning model using the public compute resources, the propagating the transformed input comprising using the public compute resources, but not the private compute resource, to process node values for the remaining nodes of the artificial neural network.

17. One or more computer-readable storage media storing data and/or instructions for an artificial neural network having a public domain and a private domain, the data and/or instructions comprising at least one of:
private domain computer-executable instructions, which when executed cause a computer system to transform input into transformed input suitable for propagating through the artificial neural network;
private domain data, which when applied as the input, is rendered suitable for propagating through the artificial neural network by the private domain computer-executable instructions, the private domain data comprising a tensor, which when applied to input, renders the input suitable for propagating through the artificial neural network;
public domain computer-executable instructions, which when executed cause a computer system to propagate transformed input through the artificial neural network to generate predictions for the input; or
public domain data representing at least a portion of nodes of the artificial neural network, which, when the public domain of the artificial neural network receives input rendered suitable for the public domain, generates output used to generate predictions for the input.

18. The computer-readable storage media of claim 17, wherein the private domain data comprises:
the private domain computer-executable instructions stored in an encrypted format, in a container secured by a license key, in object code, or in a dynamically-linked library (DLL).

19. The computing system of claim 1, wherein the instructions that cause the processor to perform a transform operation comprise instructions for performing a Fourier transform to the input used to provided the transformed input.

20. The computing system of claim 1, wherein the instructions that cause the processor to perform a transform operation comprise instructions for performing at least one of the following transforms to the input used to provided the transformed input: a discrete cosine transform (DCT), a Haar transform, a Taylor series transform, a wavelet transform, or a Hadamard transform.

* * * * *